US012392978B2

(12) United States Patent
Geens et al.

(10) Patent No.: US 12,392,978 B2
(45) Date of Patent: *Aug. 19, 2025

(54) TELECOMMUNICATION ENCLOSURE

(71) Applicant: COMMSCOPE TECHNOLOGIES LLC, Hickory, NC (US)

(72) Inventors: Johan Geens, Bunsbeek (BE); Eddy Luc Cams, Bilzen (BE); William Alan Carrico, Raleigh, NC (US); Bart Mattie Claessens, Hasselt (BE); Philippe Coenegracht, Hasselt (BE)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,008

(22) Filed: May 20, 2024

(65) Prior Publication Data

US 2024/0385408 A1 Nov. 21, 2024

Related U.S. Application Data

(63) Continuation of application No. 17/425,231, filed as application No. PCT/US2020/014620 on Jan. 22, 2020, now Pat. No. 12,019,298.

(60) Provisional application No. 62/948,034, filed on Dec. 13, 2019, provisional application No. 62/795,301, filed on Jan. 22, 2019.

(51) Int. Cl.
  *G02B 6/44* (2006.01)
(52) U.S. Cl.
  CPC ......... *G02B 6/4454* (2013.01); *G02B 6/4447* (2013.01); *G02B 6/445* (2013.01); *G02B 6/4452* (2013.01); *G02B 6/44524* (2023.05)

(58) Field of Classification Search
  CPC .. G02B 6/4454; G02B 6/4452; G02B 6/4447; G02B 6/445
  See application file for complete search history.

(56) References Cited

U.S. PATENT DOCUMENTS

| 4,805,979 A | 2/1989 | Bossard et al. |
| 6,427,045 B1 | 7/2002 | Matthes et al. |
| 12,019,298 B2* | 6/2024 | Geens ............... G02B 6/44524 |
| 2003/0103750 A1 | 6/2003 | Laporte et al. |
| 2008/0056661 A1 | 3/2008 | Mullaney et al. |
| 2009/0238531 A1 | 9/2009 | Holmberg et al. |
| 2013/0210252 A1 | 8/2013 | Ilyes |

FOREIGN PATENT DOCUMENTS

| WO | 93/13580 A1 | 7/1993 |
| WO | 2019/160995 A1 | 8/2019 |

OTHER PUBLICATIONS

International Search Report and Written Opinion of the International Searching Authority for International Patent Application No. PCT/US2020/014620 mailed May 22, 2020, 11 pages.
Extended European Search Report for European Patent Application No. 20746063.5 mailed Sep. 2, 2022, 9 pages.

* cited by examiner

*Primary Examiner* — Michael P Mooney
(74) *Attorney, Agent, or Firm* — Merchant & Gould P.C.

(57) ABSTRACT

The present disclosure relates to features of a telecommunication enclosure. Example features can include mounting plate attachment features, housing latching features, housing hinge features and fiber routing features.

20 Claims, 28 Drawing Sheets

TELECOMMUNICATION ENCLOSURE

CROSS-REFERENCE TO RELATED APPLICATIONS

This application is a continuation of U.S. patent application Ser. No. 17/425,231, filed on Jul. 22, 2021, now issued as U.S. Pat. No. 12,019,298, which is a National Stage Application of PCT/US2020/014620, filed on Jan. 22, 2020, which claims the benefit of U.S. Patent Application Ser. No. 62/795,301, filed on Jan. 22, 2019, and claims the benefit of U.S. Patent Application Ser. No. 62/948,034, filed on Dec. 13, 2019, the disclosures of which are incorporated herein by reference in their entireties. To the extend appropriate, a claim of priority is made to each of the above disclosed applications.

BACKGROUND

As demand for telecommunications increases, networks are being extended in more and more areas. In facilities such as single family homes, multiple dwelling units (MDU's), apartments, condominiums, businesses, etc., boxes are used to provide subscriber access points to a telecommunications network. Cables are also used to interconnect the subscriber access points provided by boxes with subscribers at subscriber locations (e.g., at each residence).

Various boxes for telecommunications equipment are known. The boxes used for subscriber access points can have various forms depending on such factors as the environment, the space requirements for containing telecommunications equipment, and the type of technician access needed for the telecommunications equipment. These and other considerations are related to box design and usability.

Optical fiber splice closures (which are sometimes called splice cases or enclosures) generally include a casing which provides a closed space for containing splices between optical fibers. Such closures normally also contain excess lengths of the spliced optical fibers. These excess lengths of optical fibers are normally used to carry out the fiber splicing operation, which is generally performed using splicing equipment next to the closure. Excess fiber also may be used to facilitate organization the fiber splices in the closure. Optical fiber splice closures normally include one or more trays to store the splices in an organized manner. The excess optical fiber associated with the organized splices is stored in the closure in such a way that its bend radius does not fall below a minimum bend radius of the fiber (i.e., the minimum safe radius at which the fiber may be bent without causing damage to the fiber or causing signal loss in the fiber).

There is a continued need for improvement in closures such as splice closure designs or other enclosure designs.

SUMMARY

One aspect of the present disclosure relates to a telecommunications enclosure including a housing having a base and a cover. The telecommunications enclosure includes a plurality of fiber management tabs that detachably mount to the base. When the fiber management tabs are mounted in a fiber retaining arrangement relative to the base, the fiber management tabs are configured to retain or hold or constrain optical fibers within the base. Preferably the fibers are retained along a fiber routing path within the base. In certain examples, the fiber routing path can extend around at least a portion of the perimeter of the base. In certain examples, the fiber routing path can extend around a splice tray mounting location positioned within the base. In certain examples, by detaching the tabs or by orienting the tabs in a non-retaining arrangement in which the tabs do not overlap a fiber routing region, routing or positioning of optical fibers within the base is facilitated. After the optical fibers have been routed within the base, the fiber management tabs can be returned to the retaining arrangement in which at least portions of the tabs oppose or overlie the optical fibers within the base. In this way, the tabs prevent the optical fibers from lifting or raising out of the base and also prevent the optical fibers from being pinched between the base and the cover when the cover is mounted on the base.

Another aspect of the present disclosure relates to a telecommunications enclosure including a housing having a base and a cover. The base includes a floor from which a plurality of bosses project. The bosses are configured for facilitating mounting structures such as plates or panels to the floor of the base. The plates or panels may be configured for supporting optical components such as optical splices, trays, passive optical splitters, cable anchors, wavelength division multiplexers, or splices. In certain examples, the bosses are configured for receiving fasteners. The bosses are preferably tall enough to receive the fasteners without the fasteners extending completely through the floor of the base. In certain examples, the bosses are not initially used, but are provided to allow for mounting different styles or configurations of components in the enclosure at a later date. Thus, the bosses facilitate retrofitting the enclosure at a later date without requiring the base itself to be modified.

A further aspect of the present disclosure relates to a telecommunication enclosure having first and second housing parts (e.g., pieces such as a base and a cover) that are movable relative to one another between an open position and a closed position. The first and second housing parts pivotally connect with respect to one another at a hinge. The hinge has a configuration that facilitates routing cables into the enclosure adjacent to the location of the hinge.

Another aspect of the present disclosure relates to configurations for mounting modular structures such as cable anchors or fiber optic component holders within a telecommunication enclosure. In certain examples, a plate can be provided with mounting locations for mounting the modules. In certain examples, the plate can be secured to a wall within the interior of the enclosure by a mechanical connection such as a snap-fit connection. In certain examples, snap-fit features such as tabs can be unitarily formed with a housing of the enclosure. In certain examples, the plate can fit within a recess defined within the wall of the housing. In certain examples, the wall of the housing can include a recess for providing clearance for receiving fixation structures of the modules.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
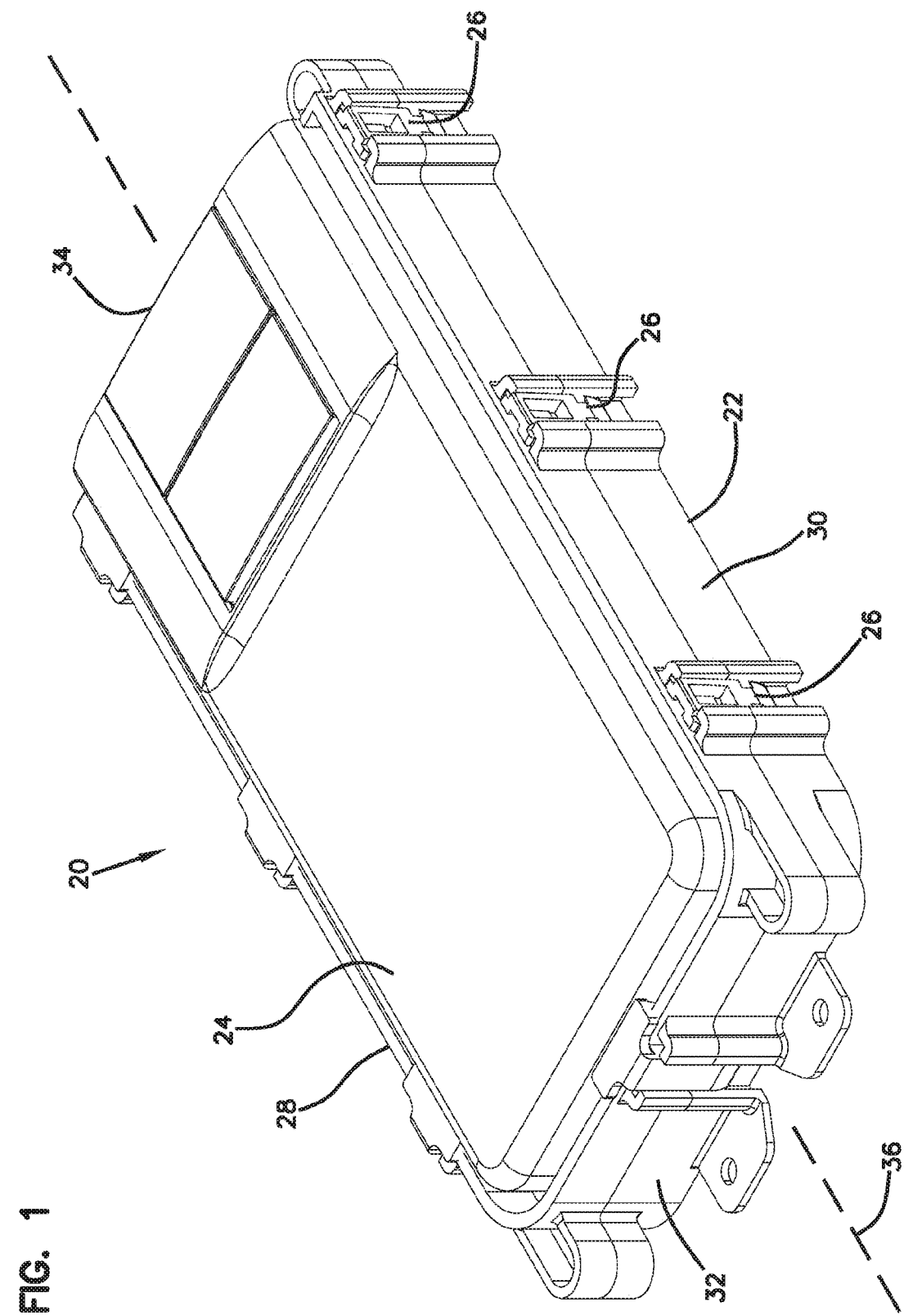
FIG. 1 is a perspective view of a telecommunications enclosure in accordance with the principles of the present disclosure.

FIG. 1 depicts a telecommunications enclosure 20 in accordance with the principles of the present disclosure. The telecommunications enclosure 20 includes a base 22 and a cover 24. The telecommunications enclosure 20 is preferably an environmentally sealed enclosure adapted for outside environmental use. It will be appreciated that the cover 24 is removable from the base 22 to provide access to an interior of the enclosure 20. In certain examples the base 22 and the cover 24 can optionally be coupled together by hinges 26. The telecommunications enclosure 20 includes opposite sides 28, 30 that extend between opposite ends 32, 34 of the enclosure 20. In the depicted example, the telecommunications enclosure 20 has an elongate configuration along a longitudinal axis 36 of the telecommunications enclosure 20. Thus, the sides 28, 30 are longer than the ends 32, 34. In certain examples, the hinges 26 are located at one of the sides 28, 30 of the enclosure 20. In other examples, hinges 26 could be located at one of the ends 32, 34. Additionally, latches can be utilized for securing the cover 24 to the base 22. The latches can be provided at the side 28 and/or the side 30 and/or the end 32 and/or the end 34. In certain examples, latches can be used in combination with the hinges 26. In certain examples, latch configurations can be adapted to mount over the hinges 26.

Figure 2:
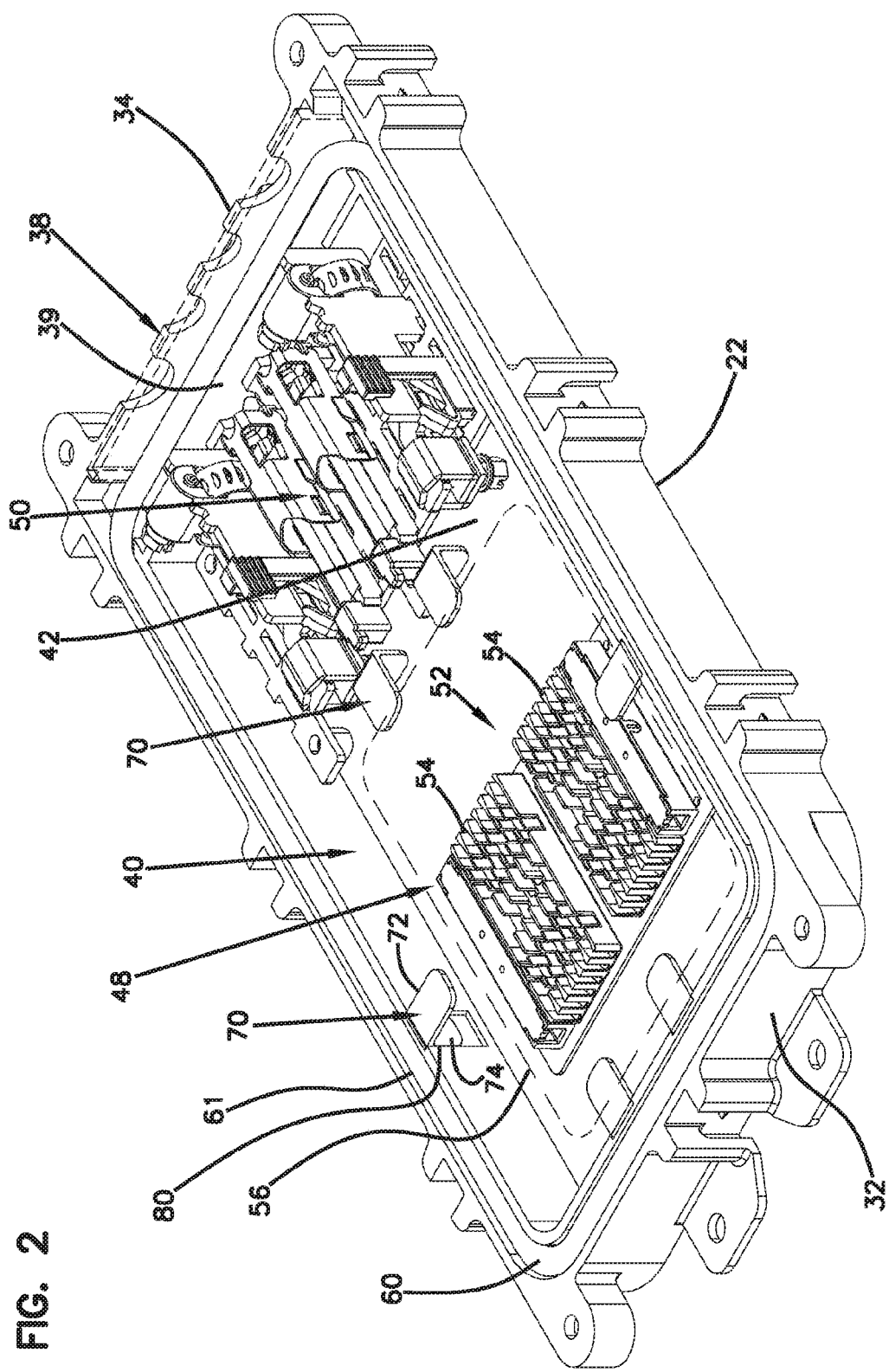
FIG. 2 is a perspective view of a base of the telecommunications enclosure of FIG. 1 with a cover of the telecommunications enclosure removed.
Figure 3:
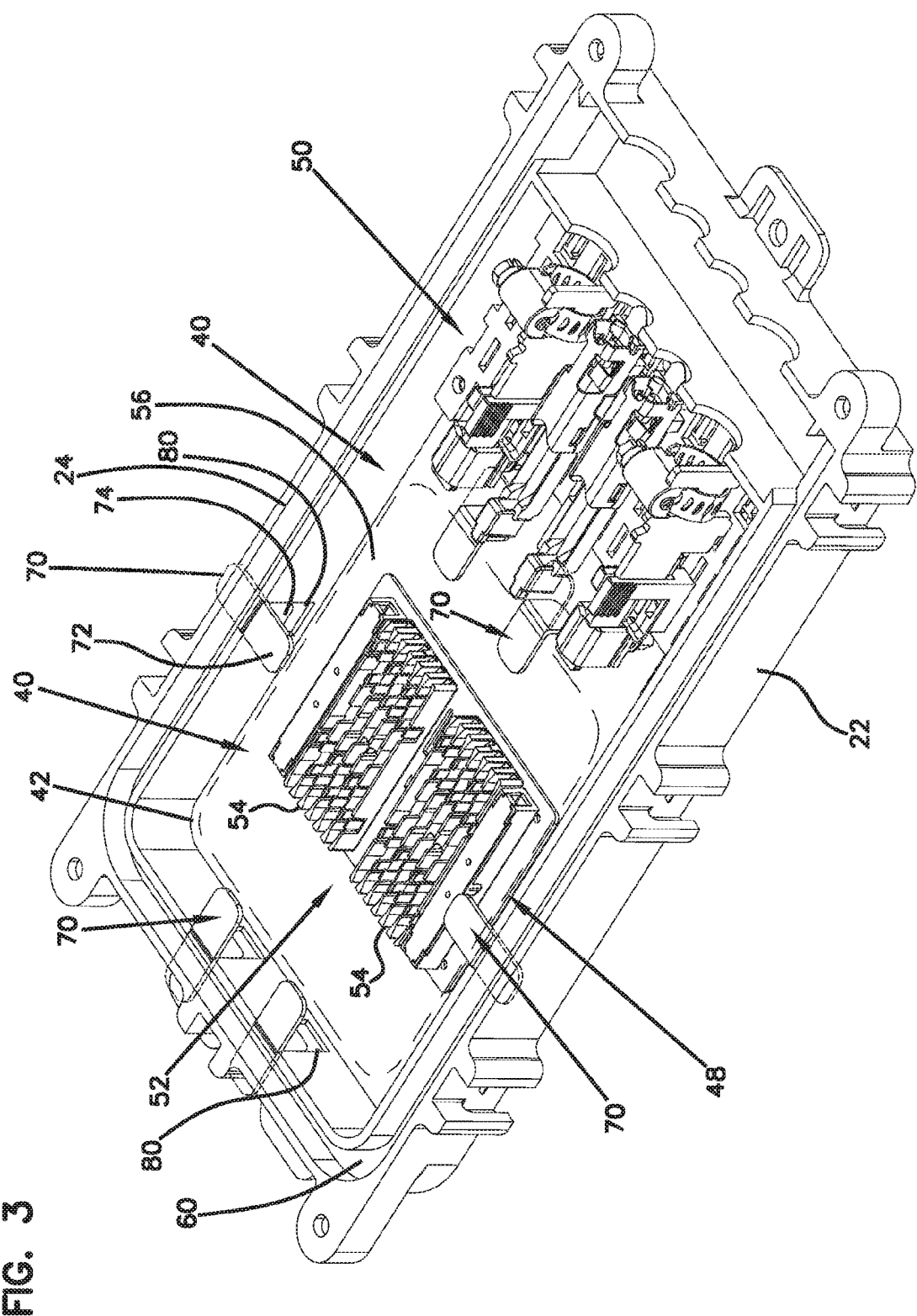
FIG. 3 is another perspective view of the base of FIG. 2.

Referring to FIGS. 2 and 3, telecommunications enclosure 20 is depicted as a splice enclosure. In the depicted example, the telecommunications enclosure 20 is a butt-style closure in which fiber optic cables can only enter and exit the telecommunications enclosure 20 through one end of the telecommunications enclosure 20. In the depicted example, the fiber optic cables can enter and enter the enclosure 20 through the end 34 of the enclosure 20. The telecommunications enclosure 20 preferably includes a cable sealing arrangement 38 positioned at the end 34. The cable sealing arrangement can include a cable sealant 39 such as gel for environmentally sealing around fiber optic cables routed into the interior of the enclosure 20 when the enclosure is closed. Volumes (e.g., blocks) of sealant can be provided in both the base 22 and the cover 24 with the cable being sandwiched and sealed between the volumes. The volumes of sealant can deform about the cable to provide sealing.

Referring still to FIGS. 2 and 3, the base 22 defines a main compartment 40. The main compartment 40 is positioned above a main base surface 42 and forms a floor-like structure of the base 22. Various components can be mounted to the main base surface 42. As depicted, within the main compartment 40, the base 22 defines a fiber splicing and fiber storage region 48 as well as a cable anchoring region 50. The cable anchoring region 50 is positioned adjacent the end 34 where the cables enter and exit the enclosure 20. The cable anchoring region 50 can include a plurality of cable anchors for securing the fiber optic cables to the base 22. Cable anchors can include clamps, cable tie locations, cable fasteners, blades for engaging and retaining the cables, and other structures. The fiber splicing and fiber storage region 48 includes a splice mounting location 52 where one or more splice trays 54 are mounted.

The splice trays 54 can be configured for holding optical splices. A typical splice between two optical fibers is protected by a splice protector that may include a heat shrink element, a reinforcing rod and an adhesive material.

The fiber splicing and fiber storage region 48 also includes a fiber routing path 56 that surrounds the splice mounting location 52. The fiber routing path 56 is located between the cable anchoring region 50 and the first end 32 of the enclosure 20. It will be appreciated that to perform a fusion splice, a significant length of optical fiber is required to be compatible with existing fusion splicing machines. The fiber routing path 56 surrounding the splice mounting location 52 provides a region where such fiber length can be stored without violating minimum bend requirements. The fiber routing path can also store lengths of uncut optical fiber passed through the enclosure from two different sections of fiber optic cable sealed at the end 34.

Referring still to FIGS. 2 and 3, the base 22 defines a perimeter channel 60 that extends about a perimeter of the enclosure 20. The perimeter channel 60 is adapted for receiving a sealing member such as a gasket 61 for providing a perimeter seal between the base 22 and the cover 24 when the cover 24 is mounted on the base 22. In certain examples, the cover 24 can include a projection such as a sealing rib or other element that engages the gasket when the cover 24 is mounted on the base 22. The perimeter channel 60 is defined between an outer wall 62 of the base 22 and an inner wall 64 of the base 22.

It is desirable to have structure for retaining the optical fibers within the interior of the base 22. For example, it is desirable to have structures that retain the optical fibers along the fiber routing path 56. In certain examples, fiber retainers overhang the floor of the base 22 prevent the fibers from lifting upwardly from the fiber routing path. In certain examples, fiber retainers or tabs can be used to prevent the optical fibers from being inadvertently pinched between the base 22 and the cover 24 when the cover 24 is mounted on the base 22.

Depicted at FIGS. 2 and 3, the telecommunications enclosure 20 includes a fiber management or containment system including a plurality of fiber management tabs 70. Each of the fiber management tabs 70 are depicted as a generally L-shaped component having a first leg 72 and a second leg 74 arranged generally perpendicular relative to one another. In certain examples, the first and second legs 72, 74 can have different lengths. For example, legs 74 can be shorter than legs 72.

In certain examples, the fiber management tabs 70 can be mounted to the base 22 via a detachable mounting configuration. For example, the fiber management tab 70 can be connected to the base by a sliding connection, a snap-fit connection, a frictional fit configuration, a press fit configuration or other configurations. As depicted, the base 22 defines a plurality of tab receivers 80 in the form of receptacles (e.g., slots) defined within the inner wall 64. To mount the fiber management tabs 70 to the base 22, one of the legs 72, 74 of each of the tabs 70 is inserted into a corresponding one of the tab receivers 80. As so mounted, the other of the legs 72, 74 projects inwardly from the inner wall 64 so as to overlie the fiber routing path surrounding the splice mounting location 52 and so as to overlie and oppose the main base surface 42. Thus, the legs 72, 74 that are not inserted into the tab receivers 80 project generally into and/or over the main compartment 40. By selecting which of the two legs 72, 74 is mounted in the tab receiver 80, the distance the non-received leg 72, 74 projects into the compartment 40 can be varied. In certain examples, the portion of the fiber management tab 70 that opposes the main base surface 42 and that functions to hold optical fibers within the main compartment 40 or hold optical fibers at a fiber routing path can be referred to as a fiber retaining portion.

In certain examples, the fiber management tabs 70 can be mounted in different arrangements. For example, the fiber management tabs can be mounted in a fiber retaining arrangement as shown at FIG. 2 in which fiber retaining portions (e.g., one of the legs 72, 74) project into or over the main compartment 40 so as to provide a fiber retaining function. In another example, the fiber management tabs 70 can be mounted in a fiber loading arrangement (e.g., a fiber non-retaining arrangement or configuration or orientation or position) in which the fiber management tabs do not interfere with or obstruct access to the interior of the base 22 and not overlap or overhang the main base surface 42. For example, as shown in phantom line at FIG. 3, the fiber management tabs 70 can be mounted in the tab receivers 80 with the non-received leg projecting outwardly from the compartment over the perimeter channel 60. In this way, optical fibers can be readily loaded into base and routed along the fiber routing path. After all the fibers have been properly routed, the fiber management tabs 70 can be changed from the fiber loading arrangement (e.g., shown in phantom line at FIG. 3) to the fiber retaining arrangement of FIG. 2 and shown in solid line at FIG. 3.

Figure 4:
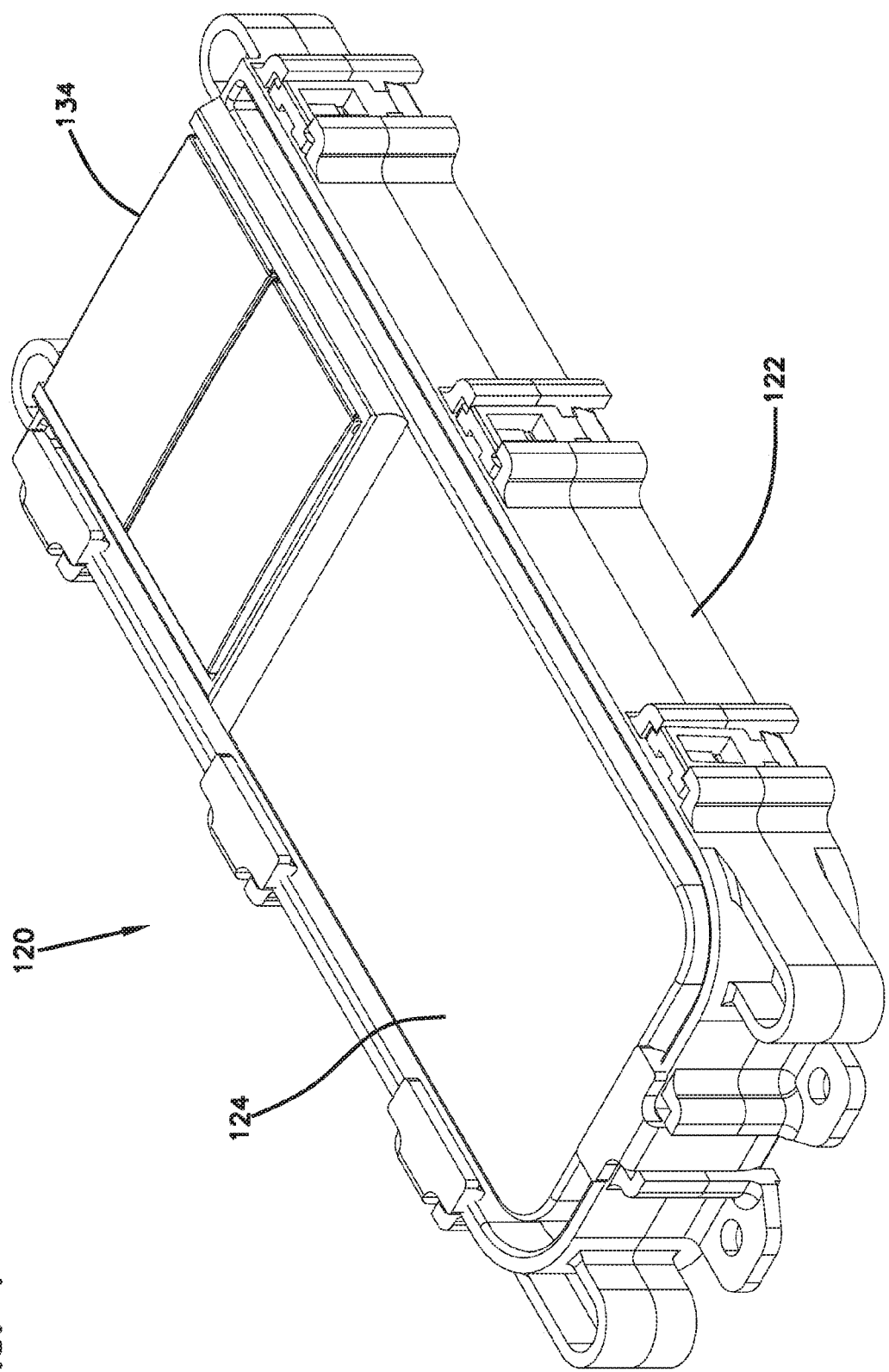
FIG. 4 is a perspective view of another telecommunications enclosure in accordance with the principles of the present disclosure.
Figure 5:
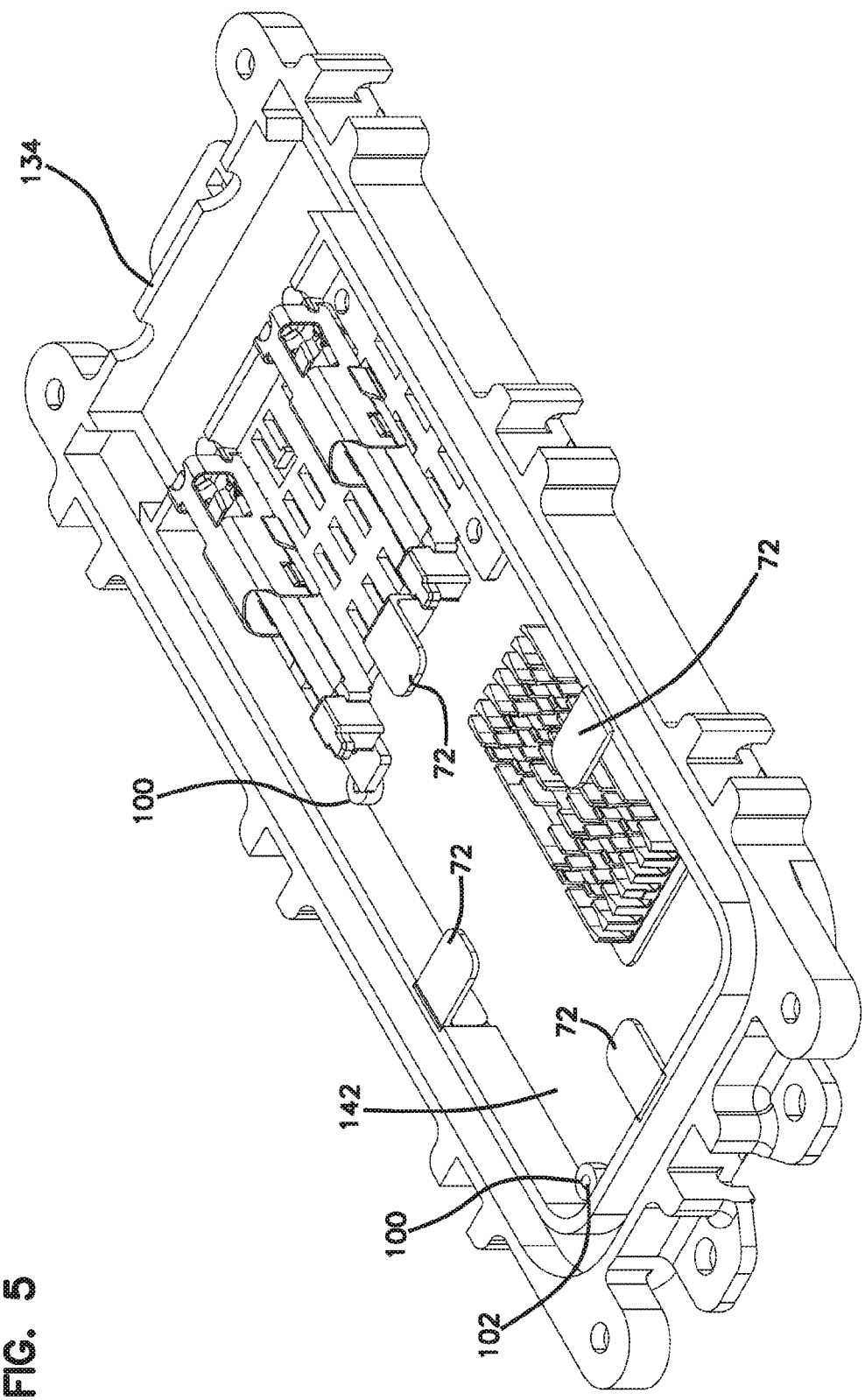
FIG. 5 is a perspective view of a base of the telecommunications enclosure of FIG. 4 with a cover of the telecommunications enclosure removed.
Figure 6:
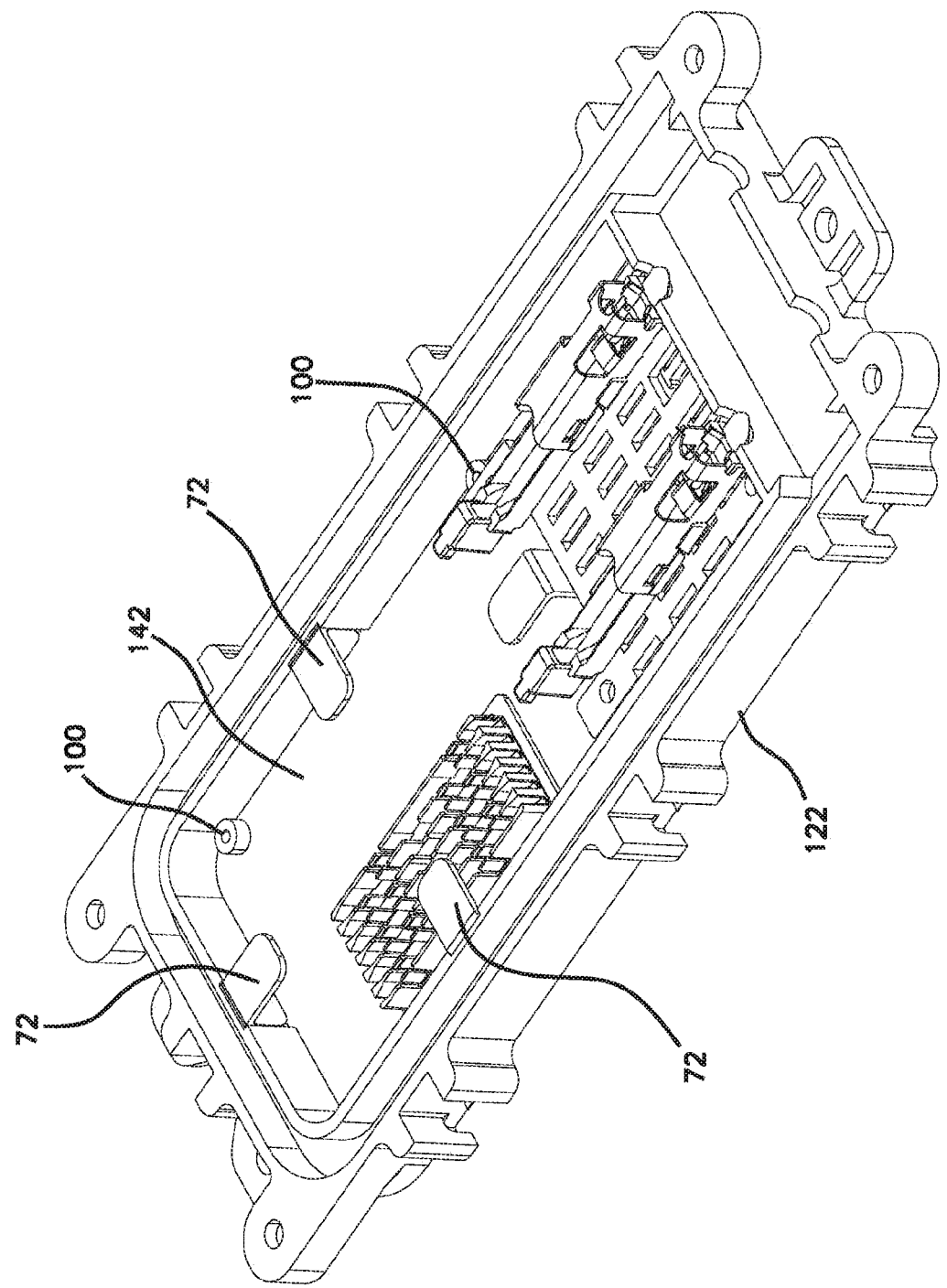
FIG. 6 is another perspective view of the base of FIG. 5.

FIGS. 4-6 illustrate another telecommunications enclosure 120 in accordance with the principles of the present disclosure. The telecommunications enclosure 120 has the same basic configuration as the telecommunications enclosure 20, except the telecommunications enclosure 120 is smaller in size. Similar to the telecommunications enclosure 20, the telecommunications enclosure 120 includes the arrangement of fiber management tabs 72 used for containing optical fibers within a base 122, particularly when a cover 124 is removed. It will be appreciated that the telecommunications enclosure 120 also includes a plurality of bosses 100 that project upwardly from a main base surface 142 of a main compartment 140 of a base 122 of the telecommunications enclosure 120. In certain examples, the bosses 100 can include a central opening 102 for receiving a fastener such as a screw. The bosses 100 have a sufficient height and width to accommodate fasteners therein without allowing the fasteners to extend completely through the base 122. In certain examples, the bosses 100 can cooperate to provide support for a component such as a mounting panel, a mounting plate, or another component desired to be mounted in the interior of the enclosure 120. The bosses 100 provide sufficient material to allow the components to be readily mounted to the base 122. In certain examples, the bosses 100 can allow the telecommunications enclosure 20 to be retrofitted to include different component configurations such as different splice mounting configurations, different optical splitting configurations, different wavelength division multiplexing configurations, different splicing configurations and different cable anchoring configurations. Similar to the telecommunications enclosure 20, the telecommunications enclosure 120 is a butt-style enclosure in which cables enter the enclosure 120 through only one end 134 of the enclosure.

Figure 7:
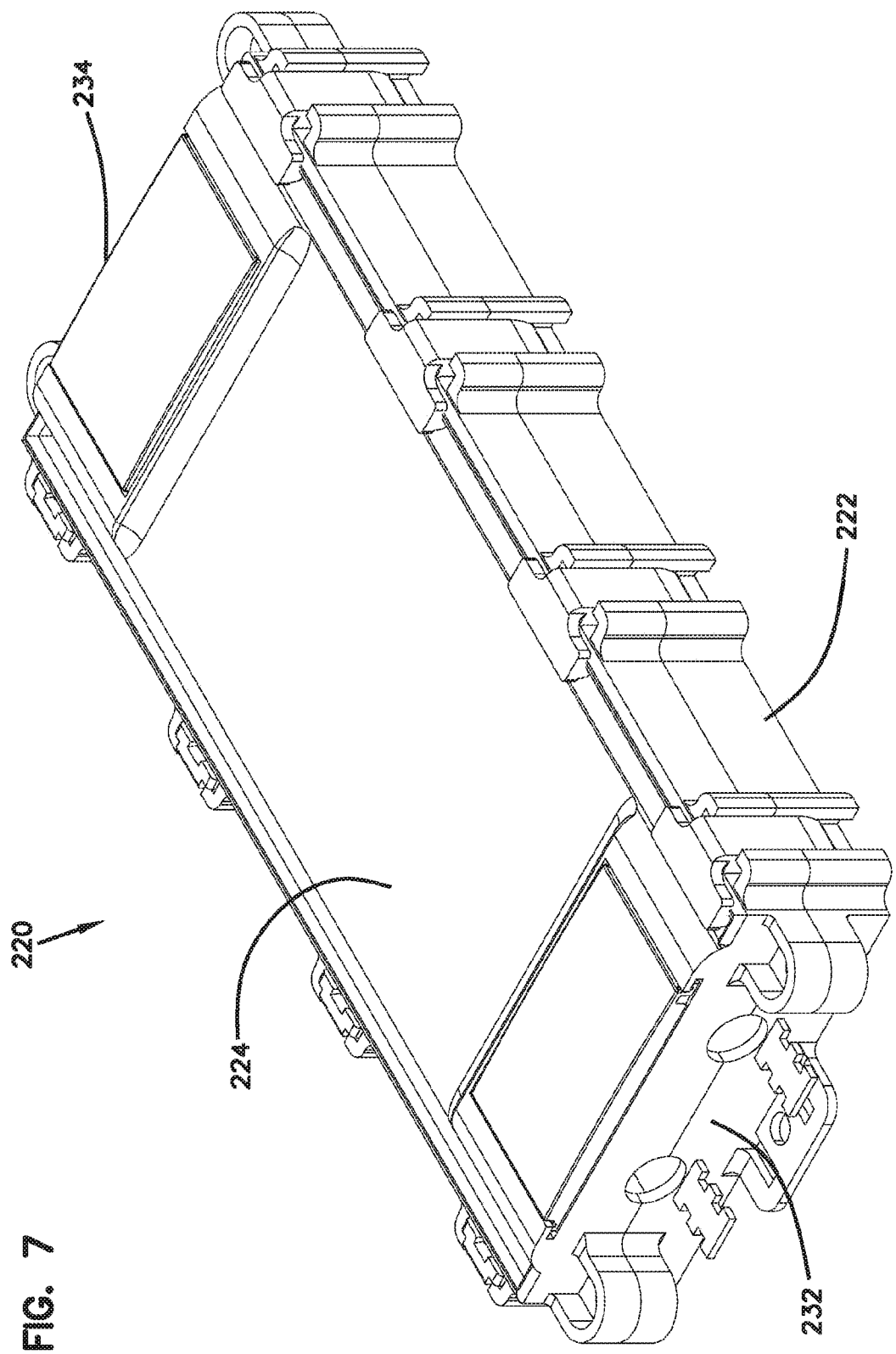
FIG. 7 is a perspective view of still another telecommunications enclosure in accordance with the principles of the present disclosure.
Figure 8:
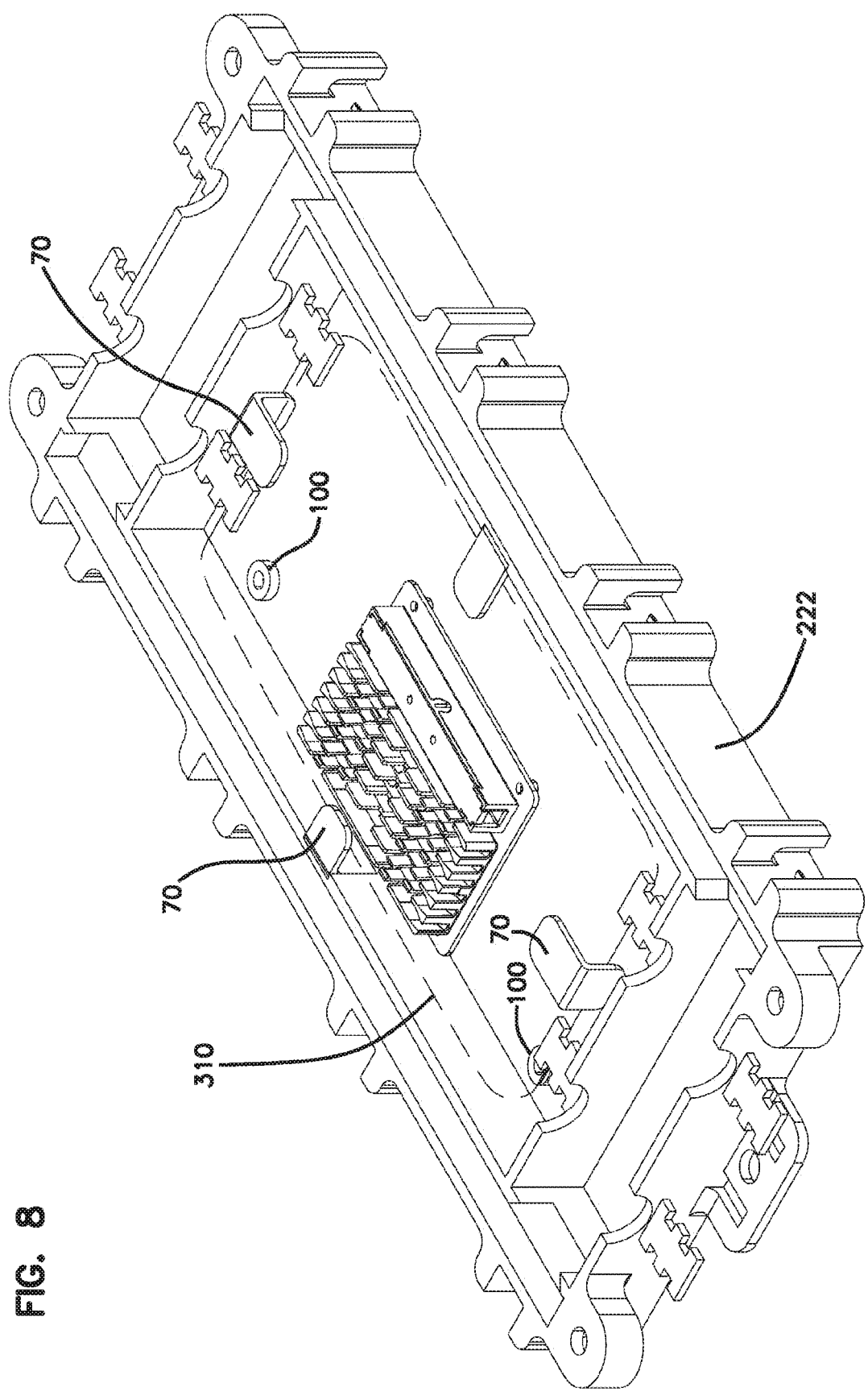
FIG. 8 is a perspective view of the telecommunications enclosure of FIG. 7 with a cover of the telecommunications enclosure removed.
Figure 9:
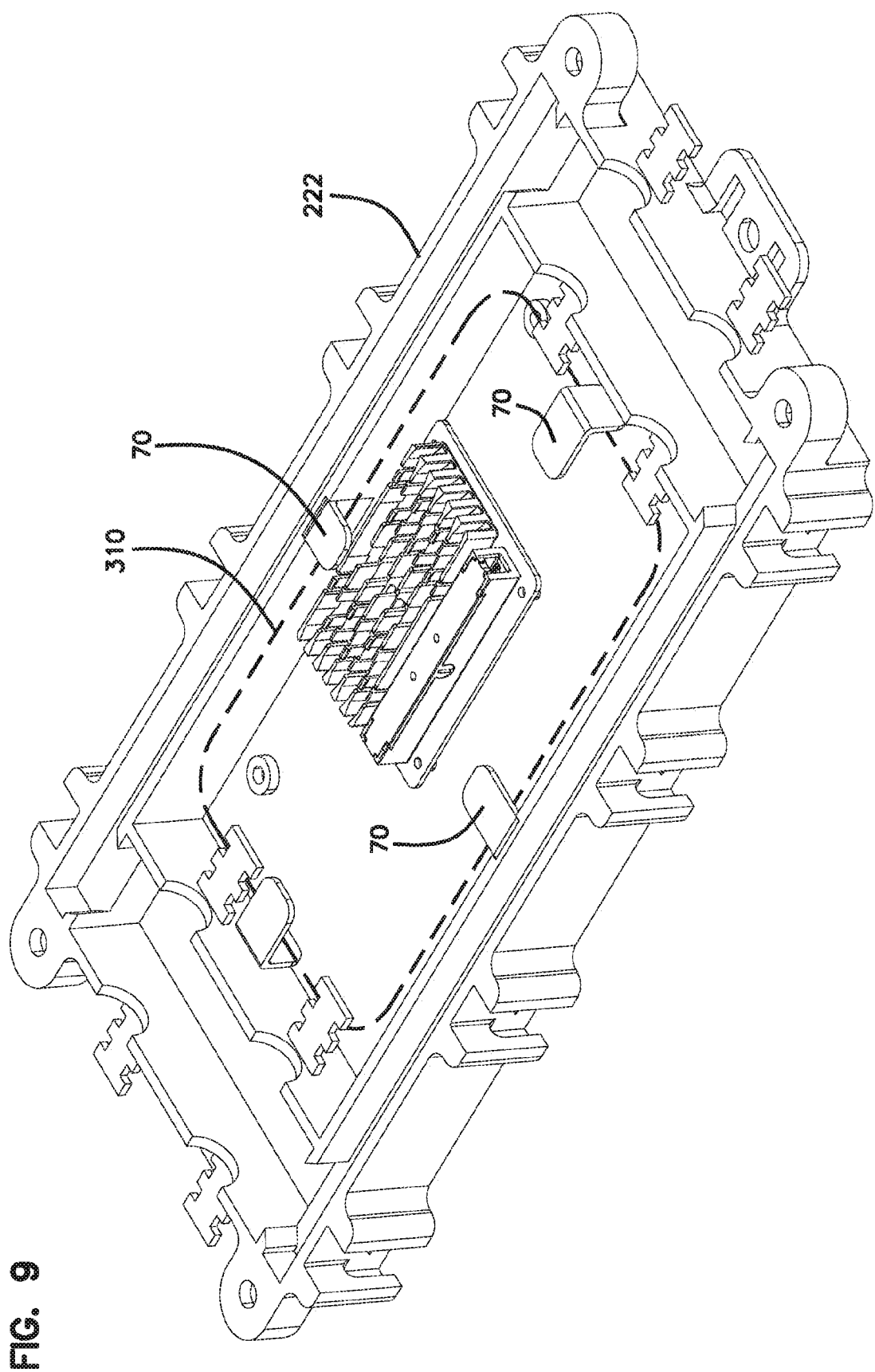
FIG. 9 is another perspective view of the base of FIG. 8.

FIGS. 7-9 illustrate still another telecommunications enclosure 220 in accordance with the principles of the present disclosure. The telecommunications enclosure 220 is similar to the enclosures 20 and 120, except the enclosure 220 has a pass-through configuration which allows fiber optic cables to be routed through opposite ends 232, 234 of the enclosure 220. The enclosure 220 includes cable tie-down locations 300 inside and outside of the enclosure 20 for securing fiber optic cables to the enclosure 220 via cable ties, clamps (e.g., hose clamps) or other structures. The telecommunications enclosure 220 includes cable sealing at both ends 232, 234 of the enclosure 220. Additionally, the telecommunications enclosure 220 includes a fiber routing region/path 310 that extends around a perimeter of the interior compartment of the enclosure 20. The fiber routing region 310 can provide loop storage of excess fiber length related to fibers spliced together, and can also provide loop storage for uncut optical fibers that pass-through the enclosure between cable sections located at opposite ends of the enclosure.

Cable anchoring locations are provided at both ends 232, 234 of the enclosure 220 and a cable splicing region is provided at a middle region of the enclosure 220. The fiber routing region/path 310 provides loop storage that loops around the fiber splicing region. In certain examples, the fiber routing can extend beneath the interior cable tie-down locations. Additionally, detachable fiber management tabs 70 of the type previously described can be mounted within the interior of the telecommunications enclosure 220 to provide for enhanced fiber retention within the compartment of a base 222 of the enclosure 220, particularly when a cover 224 is removed. It will be appreciated that the fiber management tabs 70 can provide the same functionality and can be mounted in different arrangements (e.g., fiber retaining arrangements and enhanced access arrangements). Additionally, the fiber management tabs 70 can be readily removed from the enclosure 220 to provide enhanced access. In certain examples, bosses 100 for providing compatibility with future component mounting configurations within the telecommunications enclosure can also be provided. For example, bosses 100 are shown integrated with the floor of the base.

Figure 14:
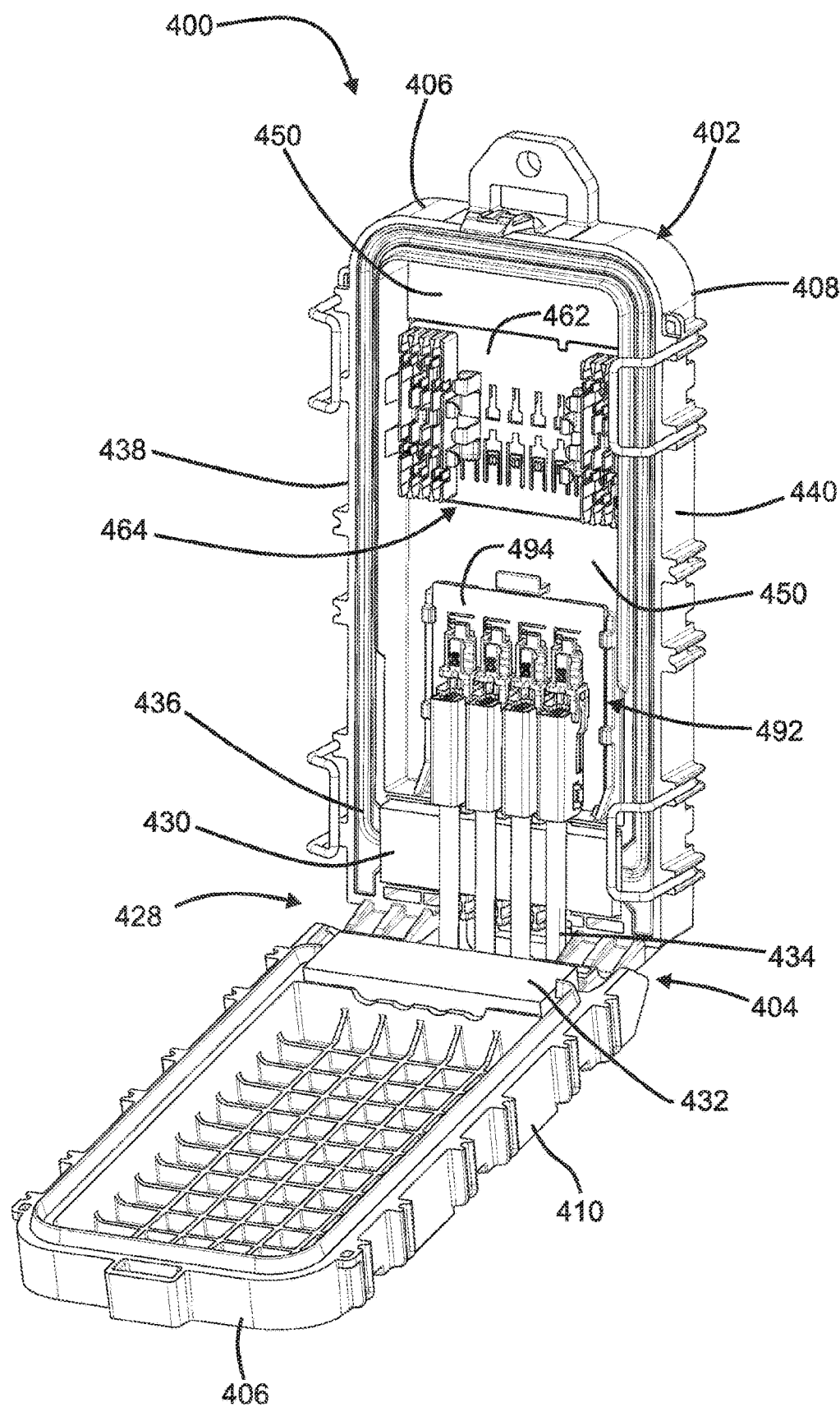
FIG. 14 shows the enclosure of FIG. 10 in an open configuration.
Figure 15:
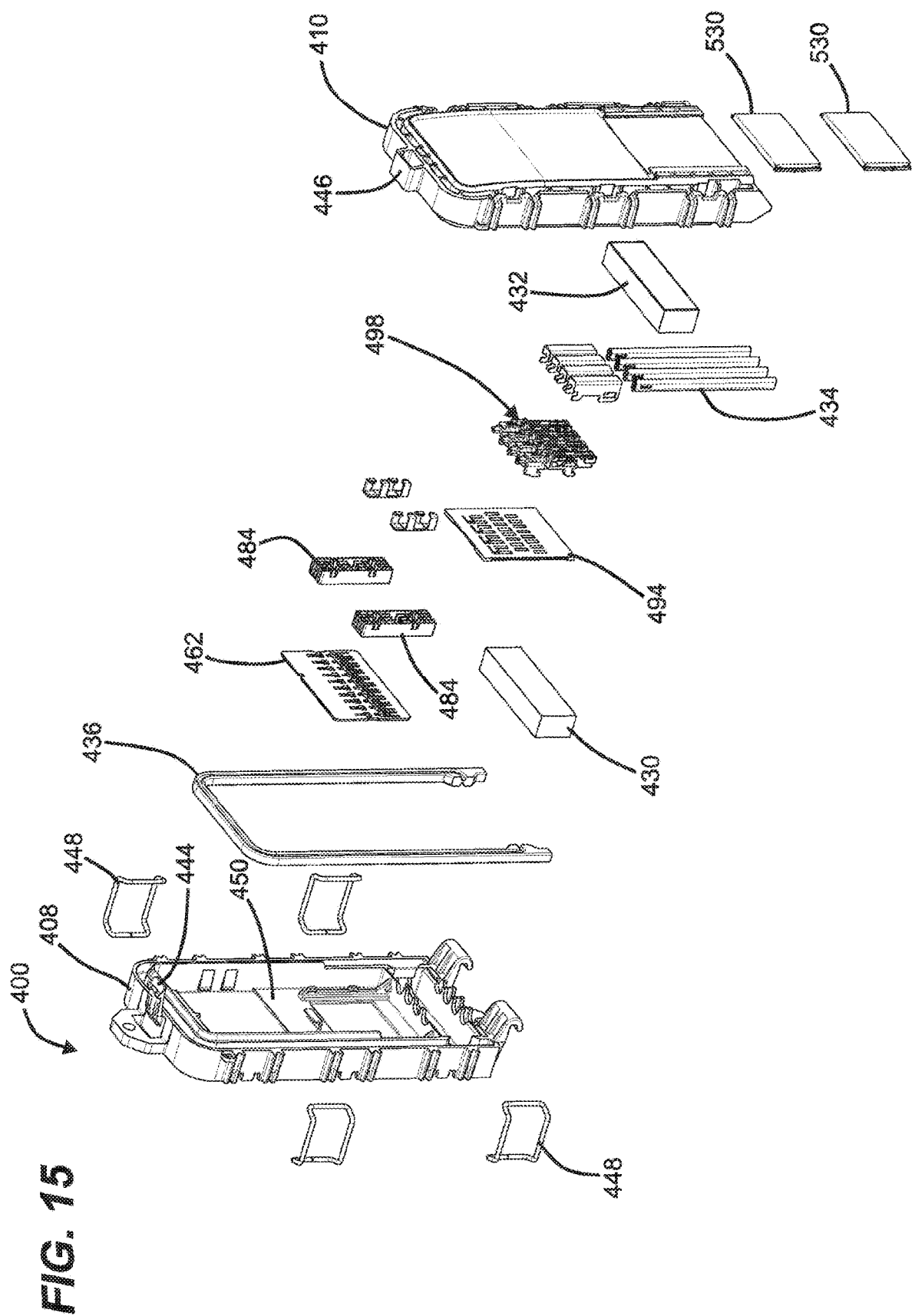
FIG. 15 is an exploded view of the enclosure of FIG. 10.
Figure 16:
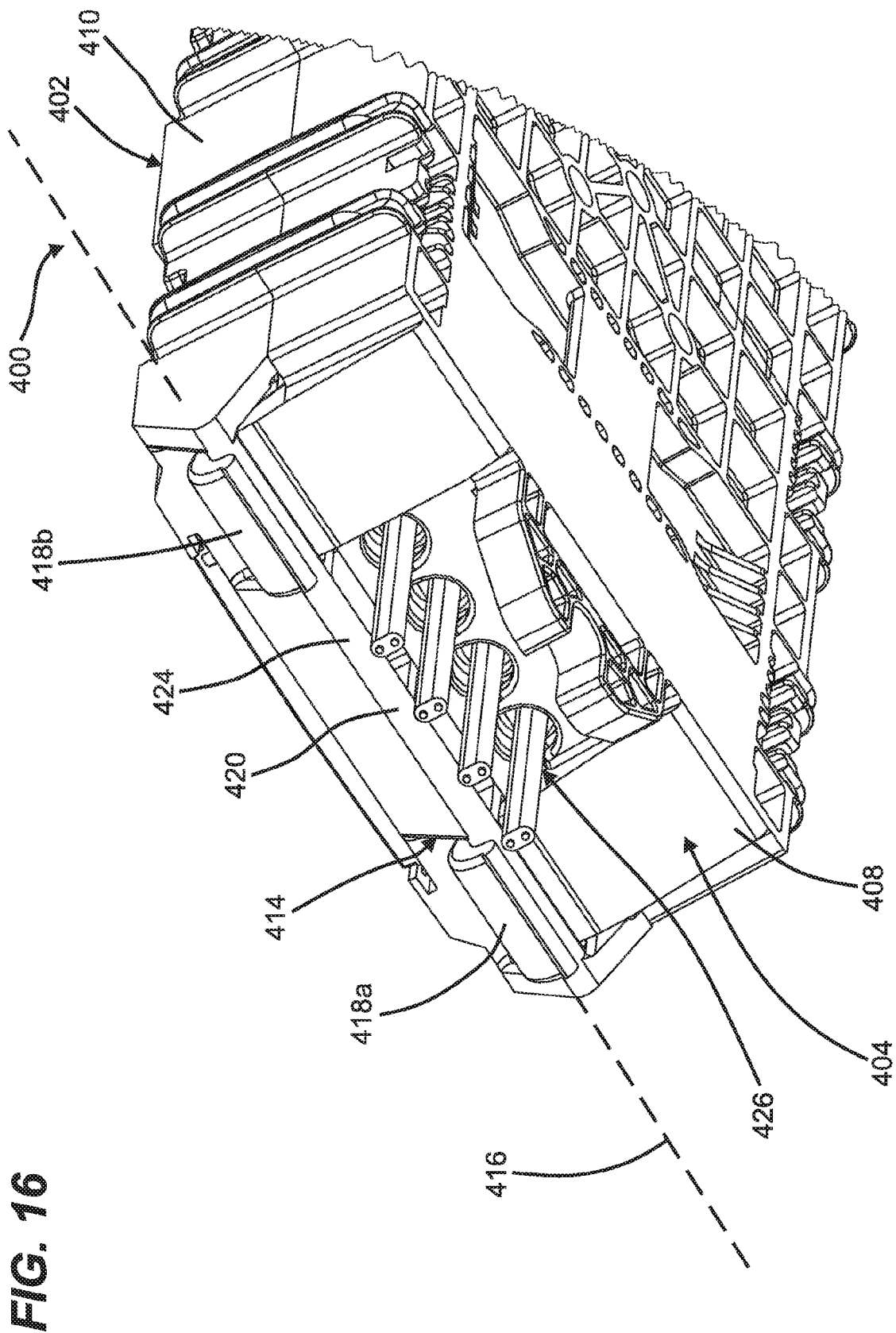
FIG. 16 is a perspective end view of the enclosure of FIG. 10.

FIGS. 10-16 depict another enclosure 400 in accordance with the principles of the present disclosure. The enclosure 400 includes an elongate housing 402 having a length L that extends between opposite first and second ends 404, 406. The elongate housing 402 includes first and second housing parts 408, 410 that cooperate to enclose an interior 412 (see FIG. 14) of the housing 402. The first and second housing parts 408, 410 are movable relative to one another between an open position (see FIG. 14) and a closed position (see FIGS. 10 and 11). Referring to FIG. 16, a hinge 414 is provided at the first end 404 of the housing 402 for allowing the first and second housing parts 408, 410 to be pivoted between the closed and open positions. The hinge 414 defines a pivot axis 416 about which the first and second housing parts 408, 410 pivot relative to one another.

Referring still to FIG. 16, the hinge 414 includes first and second hinge connection locations 418a, 418b separated by a gap 420. Each of the hinge connection locations 418a, 418b includes a hook 422 that engages a hinge pin 424. In the depicted example, the hooks 422 are unitarily formed with the first housing part 408 and the hinge pin 424 is unitarily formed with the second housing part 410. In the depicted example, the first housing part 408 forms a base of the housing 402, and the second housing part 410 forms a cover of the housing 402.

Referring again to FIG. 16, a cable pass-through location 426 is provided at the first end 404 of the housing 402. The cable pass-through location 426 is positioned in alignment with the gap 420 between the first and second hinge connection locations 418a, 418b. The cable pass-through location 426 as well as the first end 404 of the housing 402 are sealed by an end sealing arrangement 428. As shown at FIGS. 14 and 15, the end sealing arrangement 428 includes a first sealing block 430 mounted to the first housing part 408 and a second sealing block 432 mounted to the second housing part 410. It will be appreciated that the first and second sealing blocks 430, 432 can be constructed of a sealing material such as rubber, gel or the like. A cable sealing interface through which fiber optic cables 434 routed into the housing 402 extend is defined between the first and second sealing blocks 430, 432. FIG. 14 shows the housing 402 in the open position with the cables 434 routed through the cable sealing interface. When the housing 402 is closed, the first and second sealing blocks 430, 432 deform about the cables 434 to provide sealing about the cables.

It will be appreciated that a perimeter of the housing 402 is also preferably sealed when the housing 402 is in the closed position. To provide perimeter sealing, a perimeter seal 436 such as an elastomeric gasket can be mounted between the first and second housing parts 408, 410 to provide perimeter sealing when the first and second housing parts 408, 410 are moved to the closed position. In certain examples, perimeter seal 436 can fit within a channel defined by one of the housing parts 408, 410, and can be engaged by a sealing rib defined by the other of the housing parts 408, 410. In the depicted example, the perimeter seal 436 coincides with a perimeter path that extends along opposite first and second sides 438, 440 of the housing 402 and also extends around the second end 406 of the housing 402. The perimeter seal 436 also preferably contacts the end sealing arrangement 428 at the first end 404 of the housing 402 to provide seal continuity.

Figure 10:
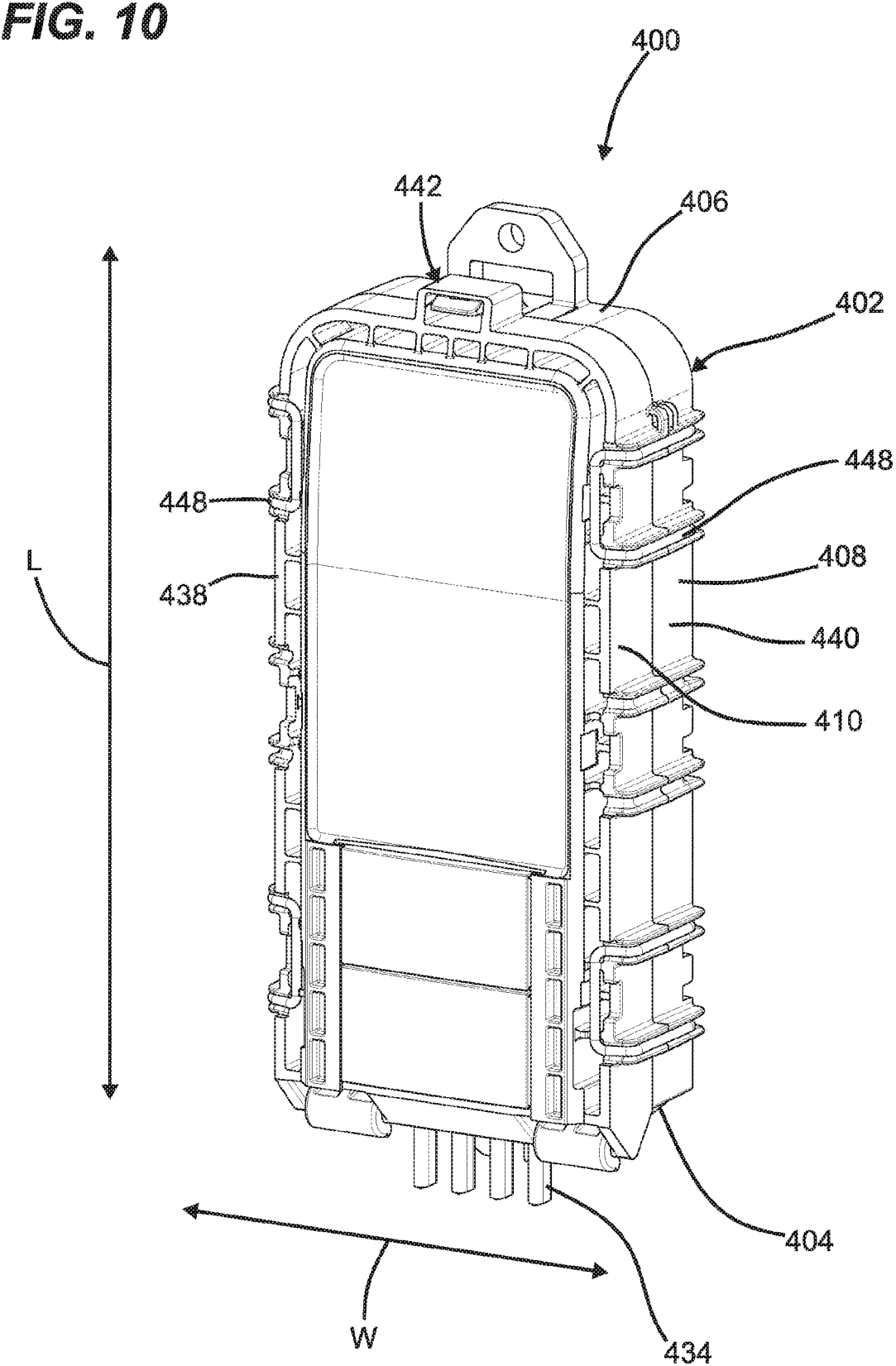
FIG. 10 is a front, perspective view of another enclosure in accordance with the principles of the present disclosure.
Figure 11:
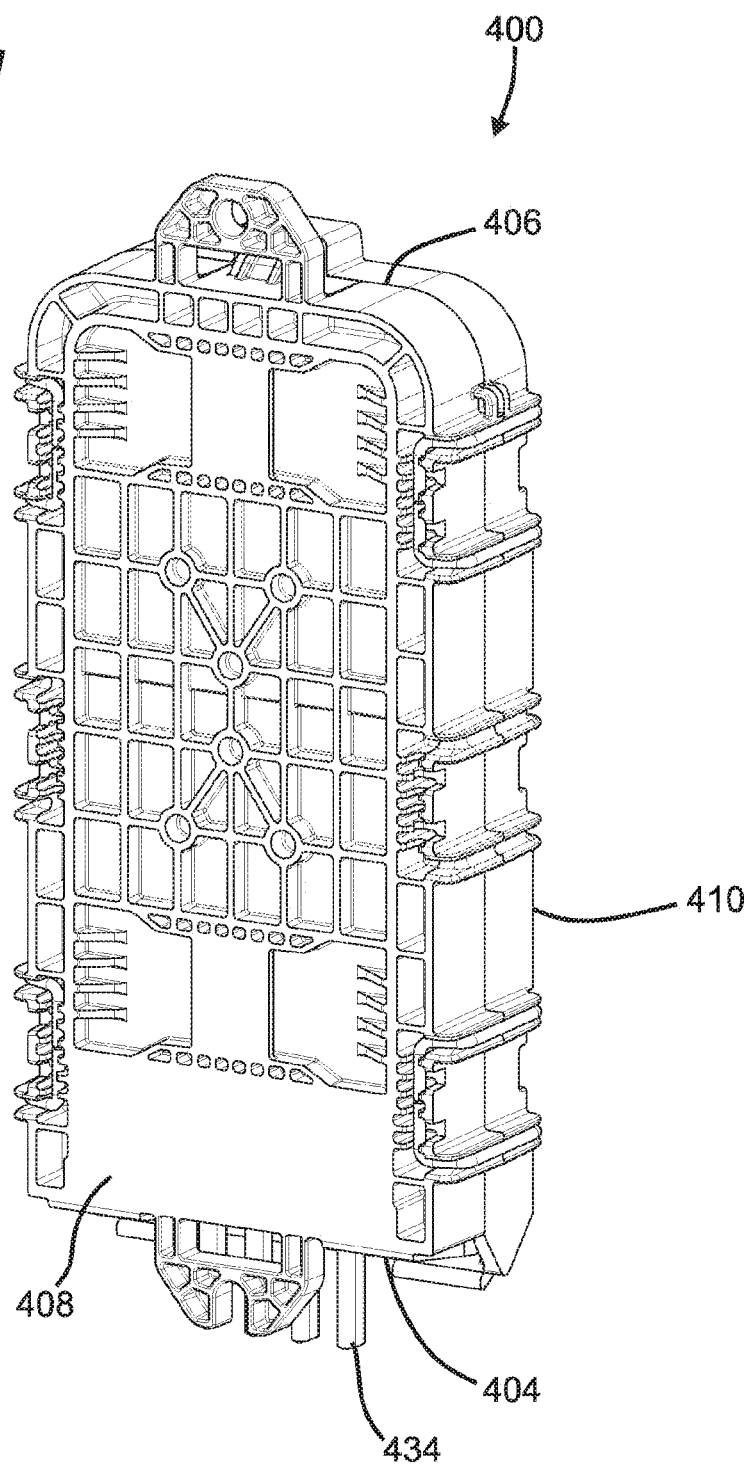
FIG. 11 is a rear, perspective view of the enclosure of FIG. 10.
Figure 12:
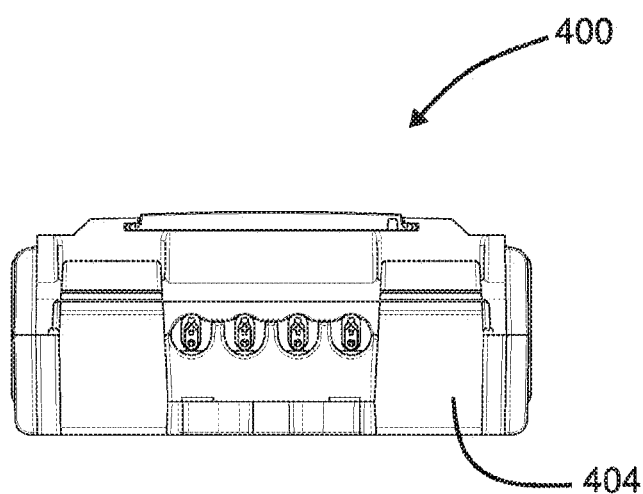
FIG. 12 is an end view of the enclosure of FIG. 10.
Figure 13:
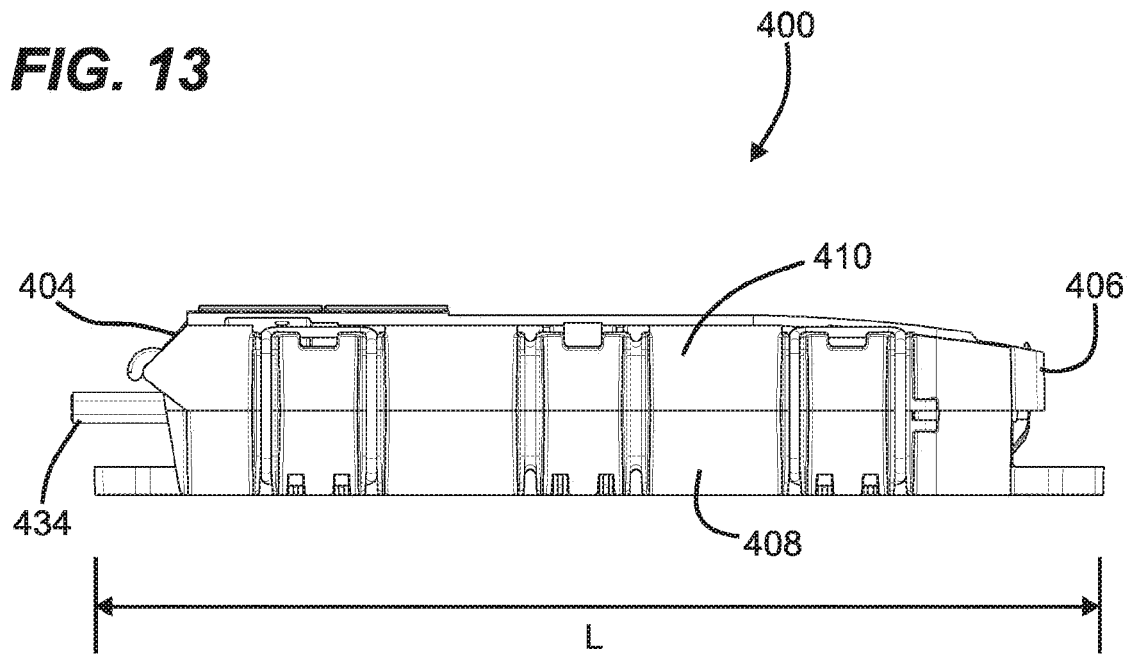
FIG. 13 is a side view of the enclosure of FIG. 10.

Referring to FIG. 10, the housing 402 includes a pre-latch 442 at the second end 406 of the housing 402 for automatically securing the first and second housing parts 408, 410 in the closed position when the first and second housing parts 408, 410 are pivoted to the closed position. The pre-latch 442 includes a latch member 444 unitarily formed with the first housing part 408 and a latch receiver 446 unitarily formed with the second housing part 410. The enclosure 400 further includes primary latches 448 positioned along the first and second sides 438, 440 of the housing for latching the housing 402 in the closed position. In certain examples, the primary latches 448 can each include a spring clip or other resilient structure for holding the housing 402 in the closed position and for applying sealing pressure on the perimeter seal 436 such that seal integrity is maintained over time.

Figure 17:
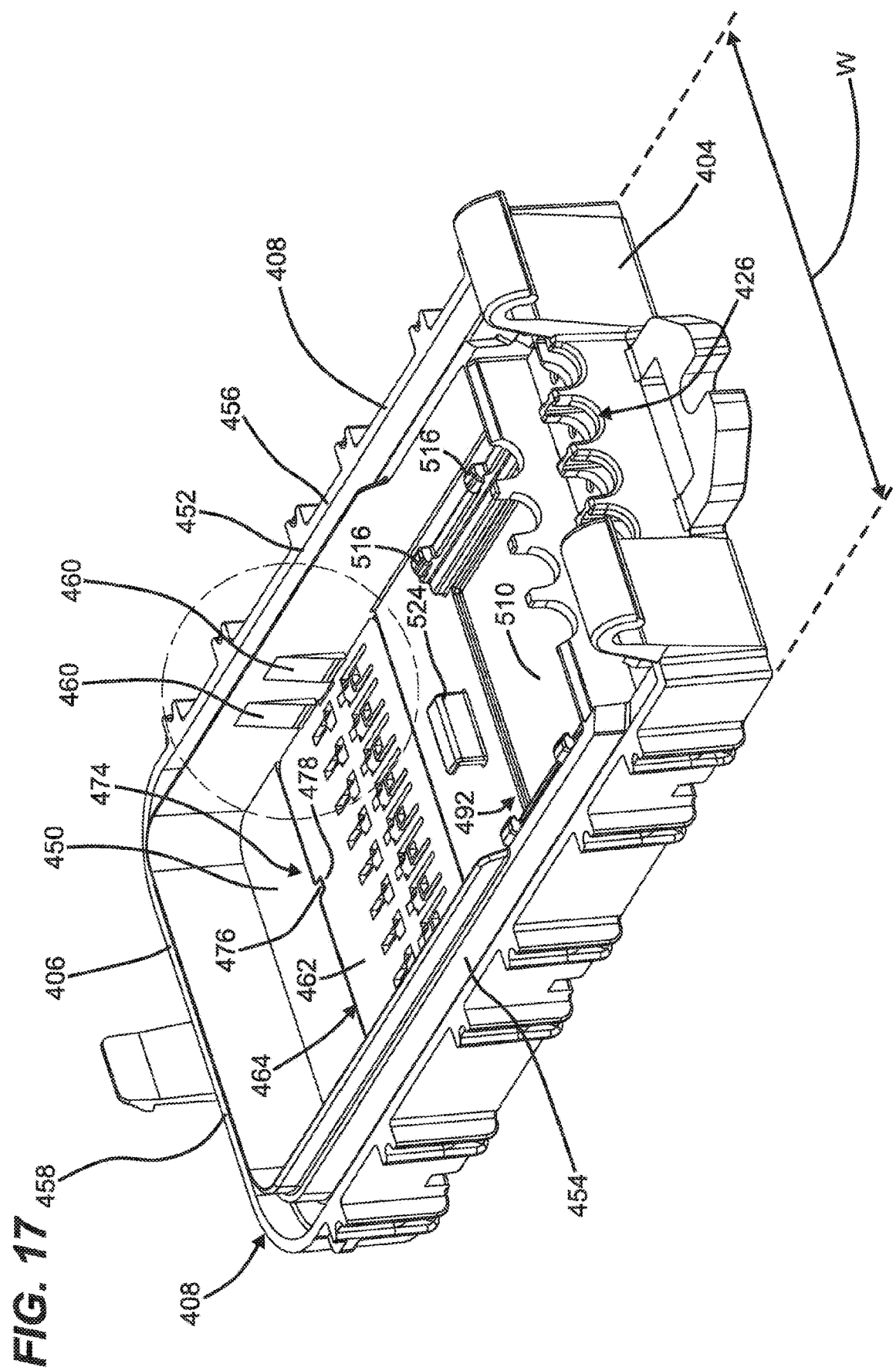
FIG. 17 shows a base of the enclosure of FIG. 10 with a cover of the enclosure removed.
Figure 18:
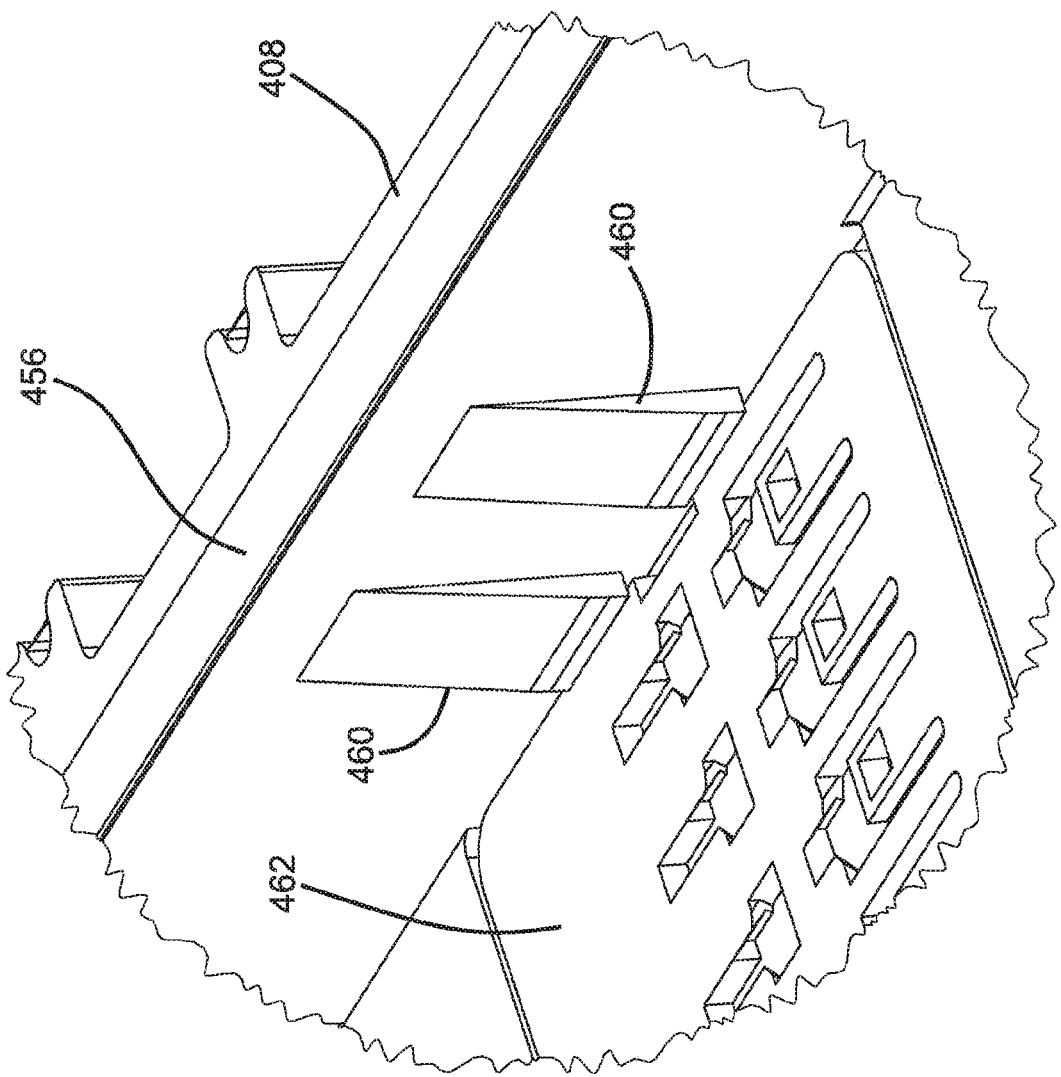
FIG. 18 is an enlarged view of a portion of FIG. 17 showing a snap-fit connection between the housing and a module mounting plate.
Figure 19:
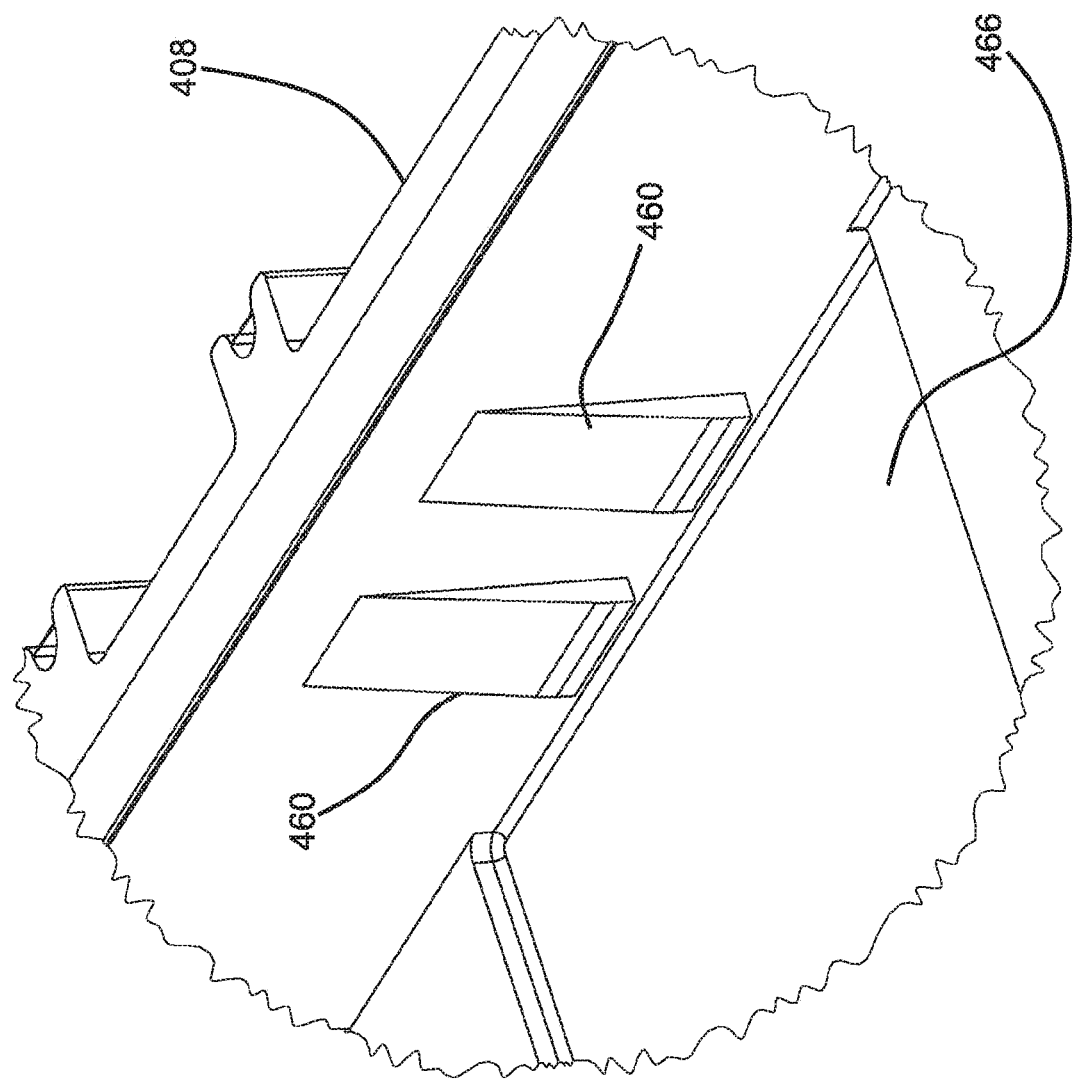
FIG. 19 is the view of FIG. 18 with the module mounting removed.
Figure 20:
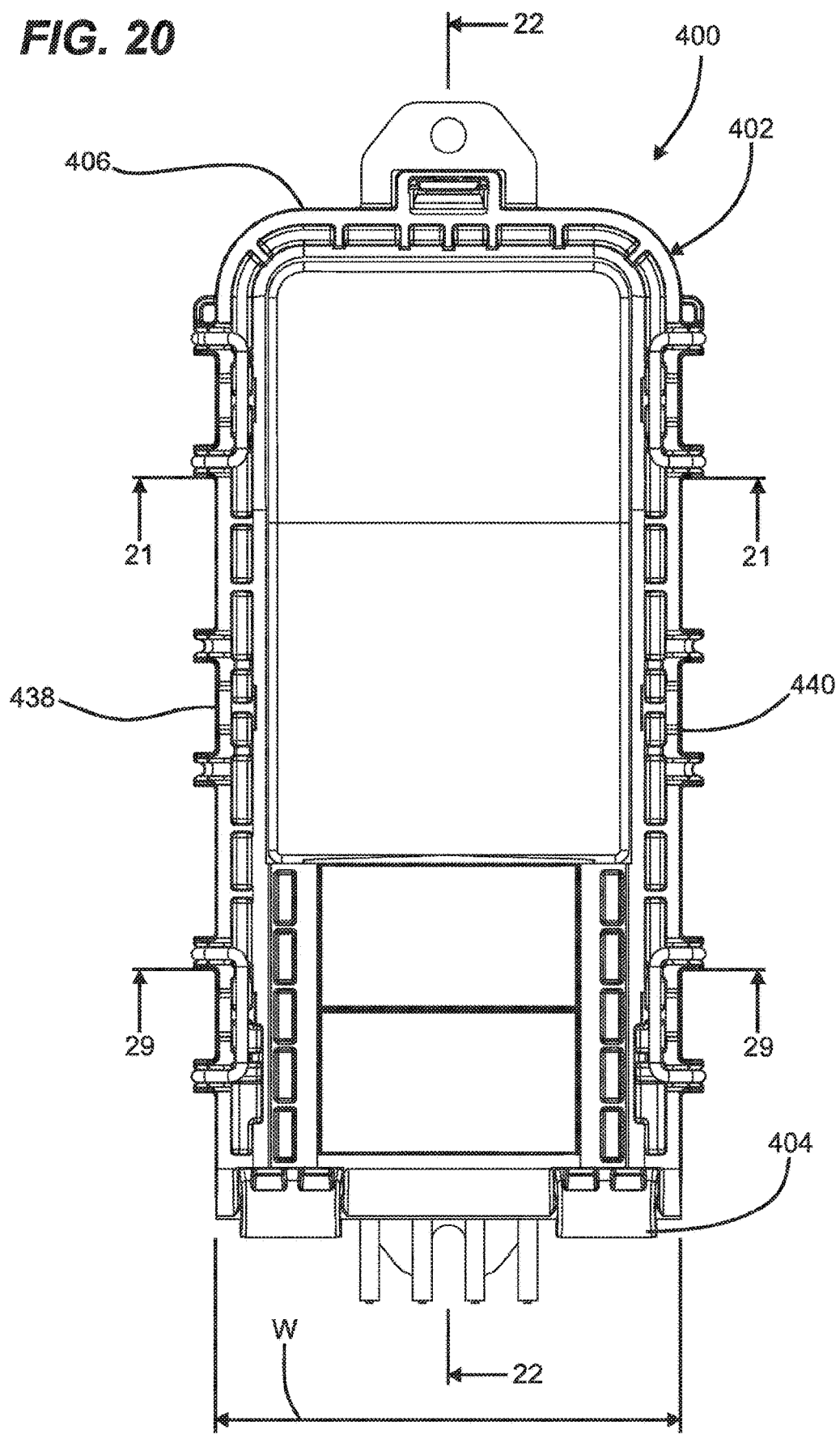
FIG. 20 is a front view of the enclosure of FIG. 10.

Referring to FIGS. 14, 15, and 17, the first housing part 408 includes a main wall 450 and a perimeter wall 452 that projects from the main wall 450. The perimeter wall 452 includes first and second sidewall portions 454, 456 respectively at the first and second sides 438, 440 of the housing 402. The perimeter wall 452 also includes an end wall portion 458 that extends between the first and second sidewall portions 454, 456 at the second end 406 of the housing 402. The first and second sidewall portions 454, 456 are separated by a width W of the housing 402.

Referring to FIGS. 17-19 and 21, plate retention tabs 460 are unitarily formed with the first and second sidewall portions 454, 456. The plate retention tabs 460 are configured for securing a component mounting plate 462 at the main wall 450. The component mounting plate 462 is sized to extend across the width W of the housing and is retained against the main wall 450 at a component plate mounting location 464 within the interior of the housing 402 by a snap-fit connection provided by the plate retention tabs 460. Specifically, the plate retention tabs 460 corresponding to the first and second sidewall portions 454, 456 engage opposite edges of the plate 462 to retain the plate 462 against the main wall 450. When the component mounting plate 462 is pressed into the component plate mounting location 464, the mounting plate 462 and/or the plate retention tabs 460 flex thereby allowing the edges of the mounting plate 462 to move past the retention tabs 460 and snap into a retained position in which the retention tabs 460 overlap the edges of the plate 462.

As shown at FIGS. 19, 21, 22 and 23, the main wall 450 defines a plate recess 466 for receiving the component mounting plate 462. In a preferred example, the plate recess 466 has a depth equal to a thickness of the component mounting plate 462 such that when the component mounting plate 462 is mounted within the plate recess 466, a front side of the component mounting plate 462 is flush with a primary surface 468 of the main wall 450.

Figure 21:
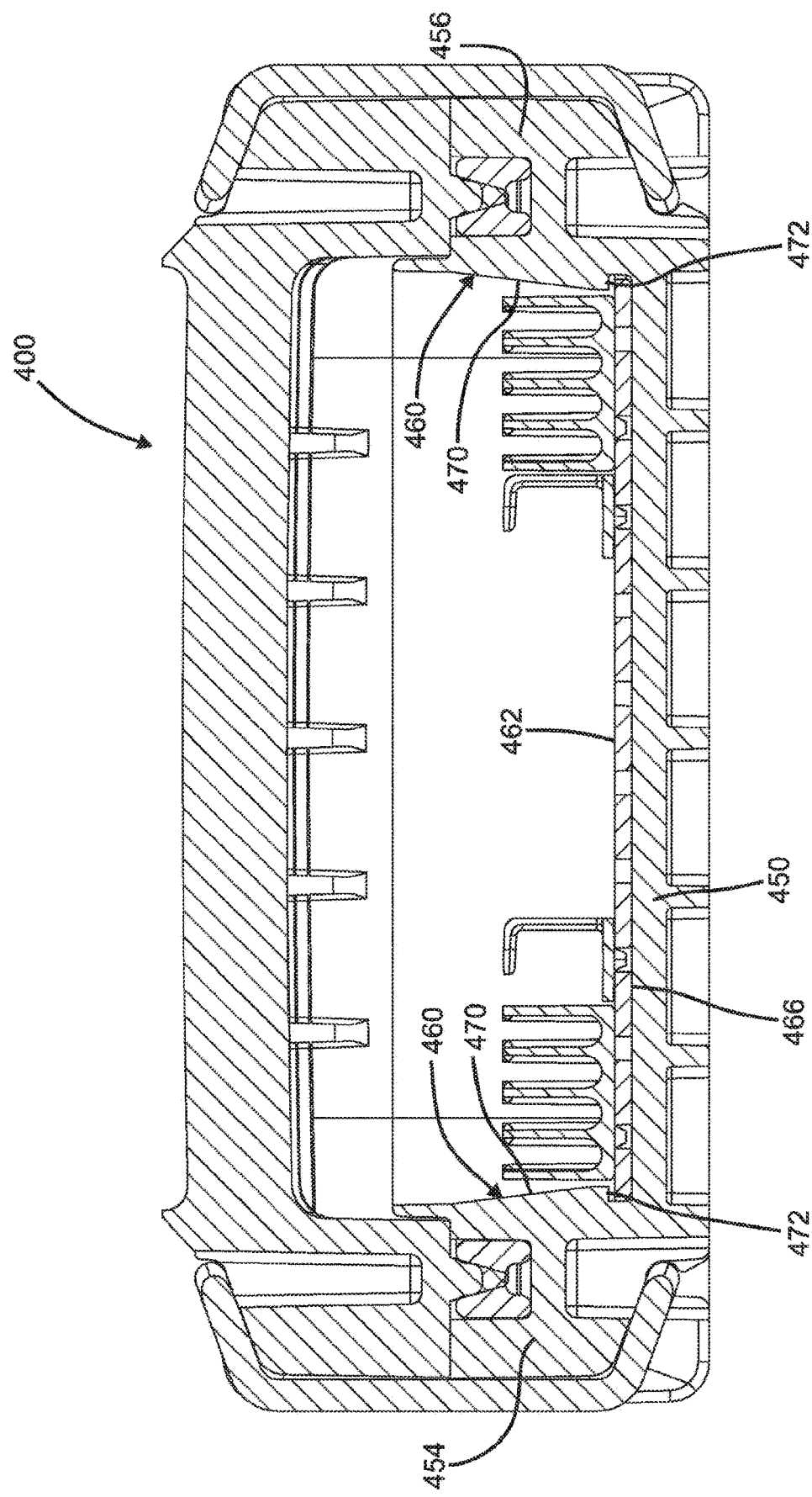
FIG. 21 is a cross-sectional view taken along section line 21-21 of FIG. 20.

Referring to FIG. 21, each of the plate retention tabs 460 includes a ramp surface 470 that angles away from its corresponding sidewall portion 454, 456 into the interior of the housing 402 as the ramp surface 470 extends in a direction toward the main wall 450. The ramp surfaces 470 terminate at shoulder portions 472 that oppose the main wall 450. When the mounting plate 462 is snapped into the plate mounting location 464, the shoulder portions 472 oppose the front side of the mounting plate 462 thereby retaining the mounting plate 462 within the plate recess 466.

Referring to FIG. 17, a keying interface 474 is defined between the component mounting plate 462 and the main wall 450 to ensure that the component mounting plate 462 is mounted at a single pre-determined orientation within the plate recess 466. The keying interface 474 preferably includes a key 476 provided on one of the main wall 450 and the mounting plate 462 that fits within a key receptacle 478 provided on the other of the main wall 450 and the mounting plate 462. In the depicted example, the key 476 is integrated with the main wall 450 and projects into the plate recess 466, and the key receptacle 478 is defined at an edge of the mounting plate 462. The mounting plate 462 also includes side notches 480 adapted for receiving a tool such as a screwdriver for facilitating removing the mounting plate 462 from the plate recess 466.

Figure 24:
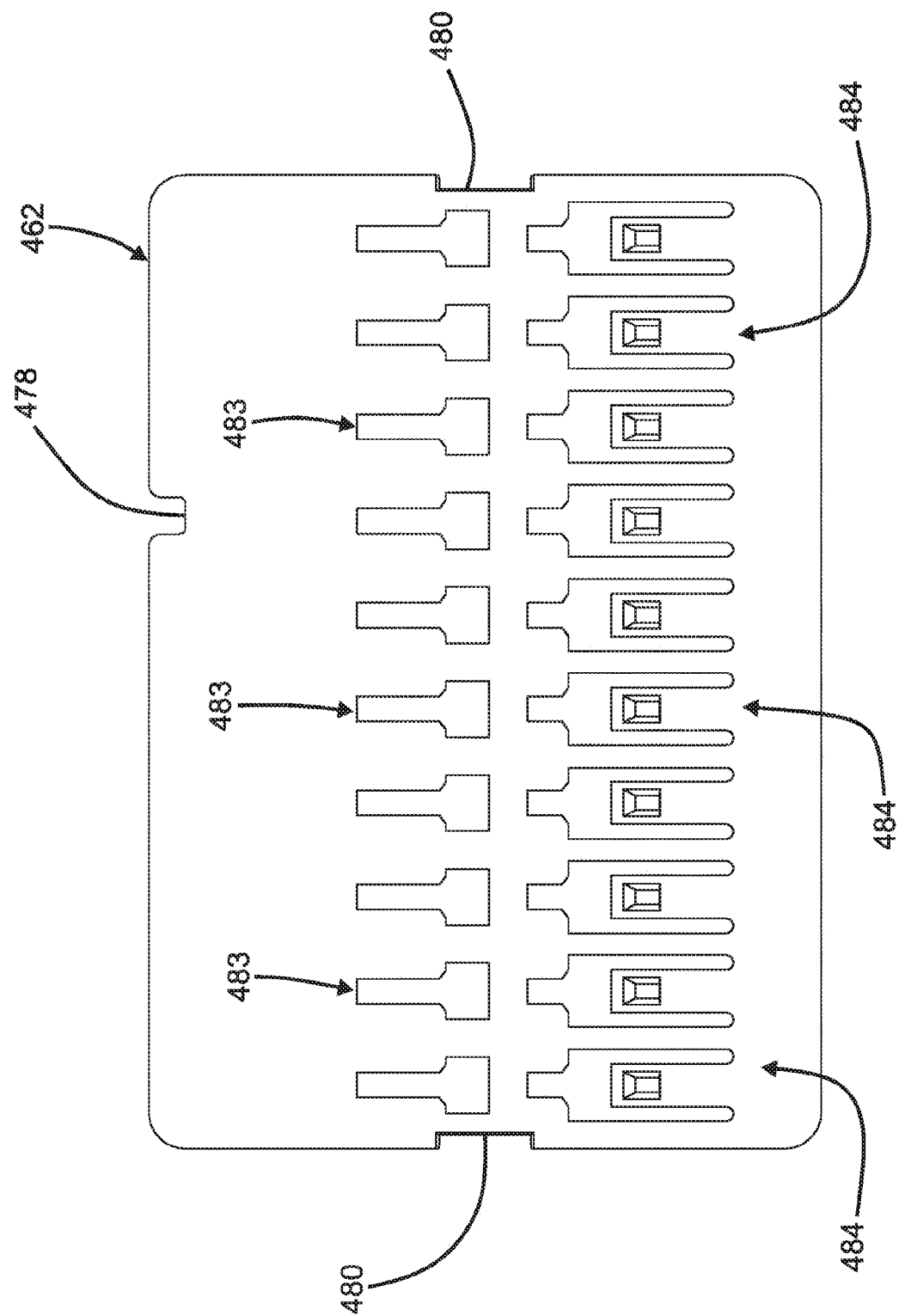
FIG. 24 is a front plan view of one of the module mounting plates of the enclosure of FIG. 10.
Figure 26:
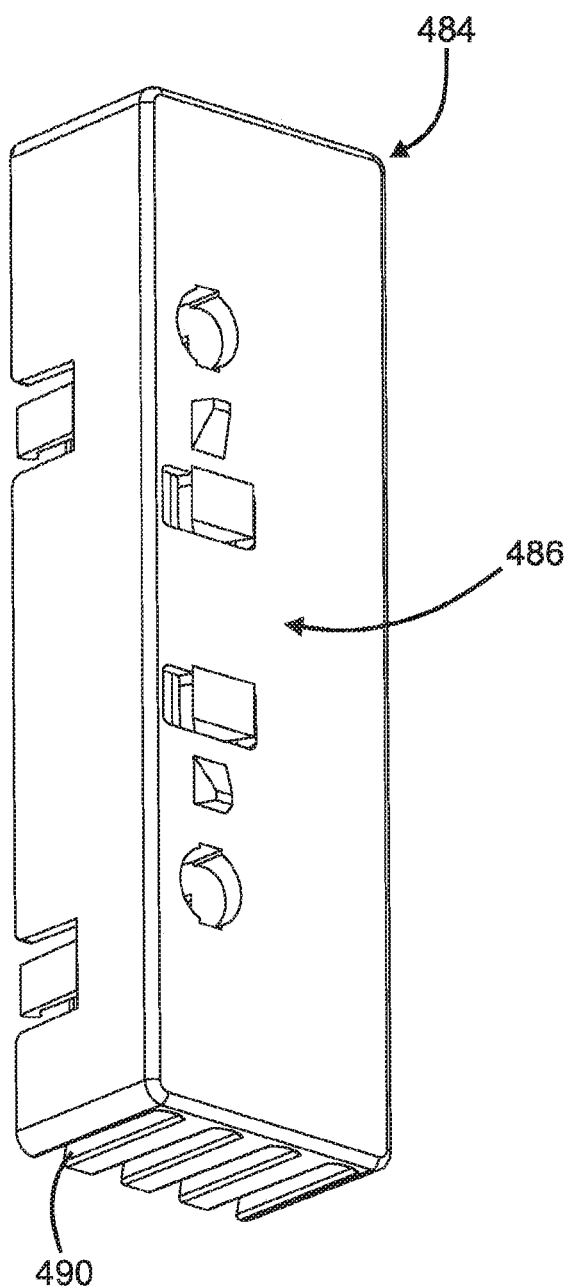
FIG. 26 is a rear perspective view of an example component holding module having a connection interface compatible with mating connection interfaces provided in the plate of FIG. 24.

As shown at FIG. 14, the mounting plate 462 includes a plurality of module mounting locations 482 for mounting modules such as component holding modules 484 to the mounting plate 462. In certain examples, the modules 484 are secured at the module mounting locations 482 by connection interfaces that include snap-fit features. FIG. 24 depicts example connection interfaces 483 at the module mounting locations 482. The connection interfaces 483 are adapted to interlock with connection interfaces 486 (see FIG. 26) provided at back sides of the modules 484. In certain examples, the connection interfaces can include mating tongue and groove configurations that are slid together and latched in a locked position by a flexible latch such as a cantilever 488. Further details about the connection interfaces are disclosed by PCT International Publication No. WO2019/160995, which is hereby incorporated by reference in its entirety. It will be appreciated that the component holding modules 484 can include slots 490 or other structures adapted for holding optical components such as passive optical power splitters, wavelength division multiplexers or optical splice reinforcing sleeves.

Figure 25:
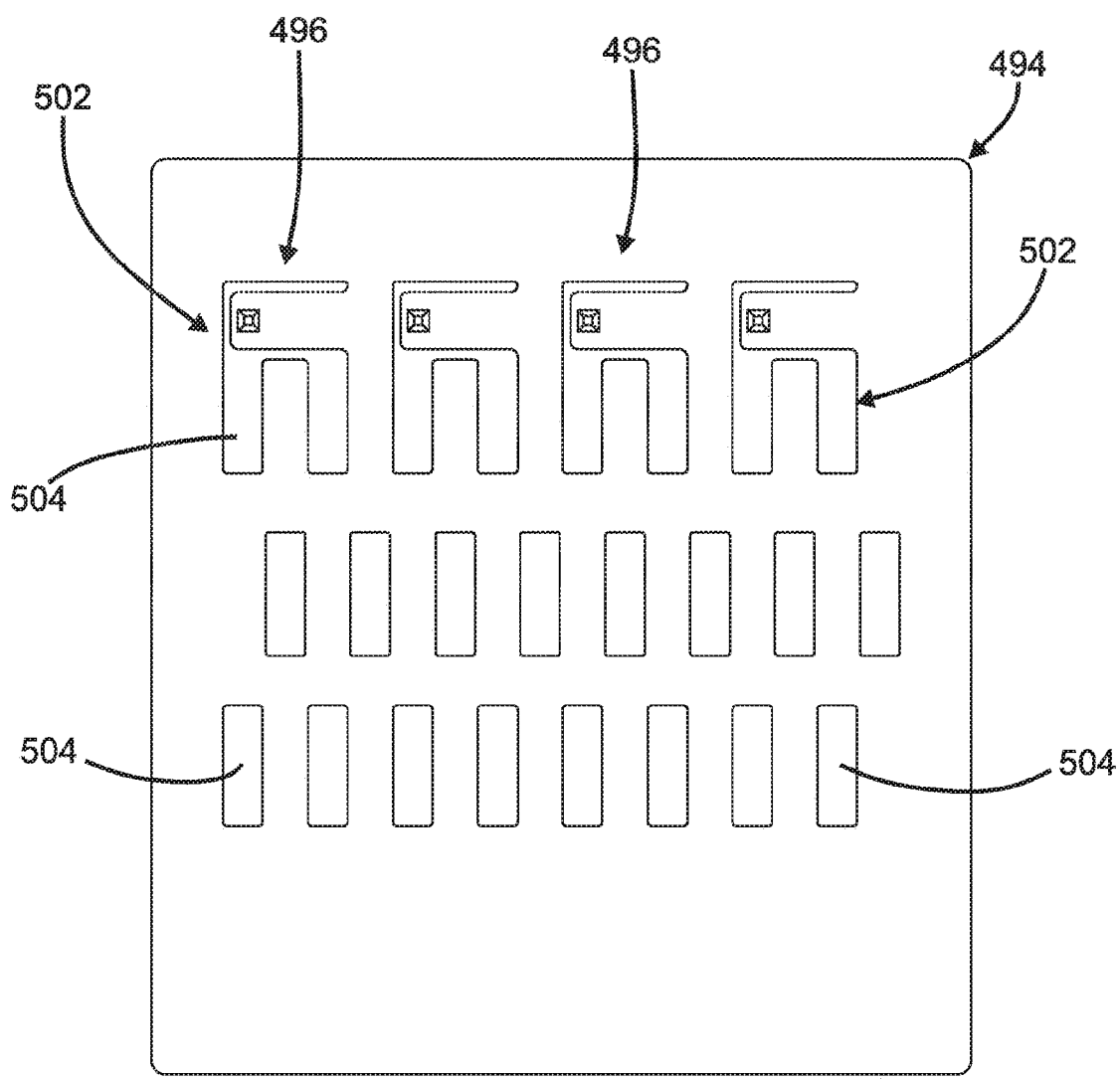
FIG. 25 is a front, plan view of another module mounting plate of the enclosure of FIG. 10.
Figure 27:
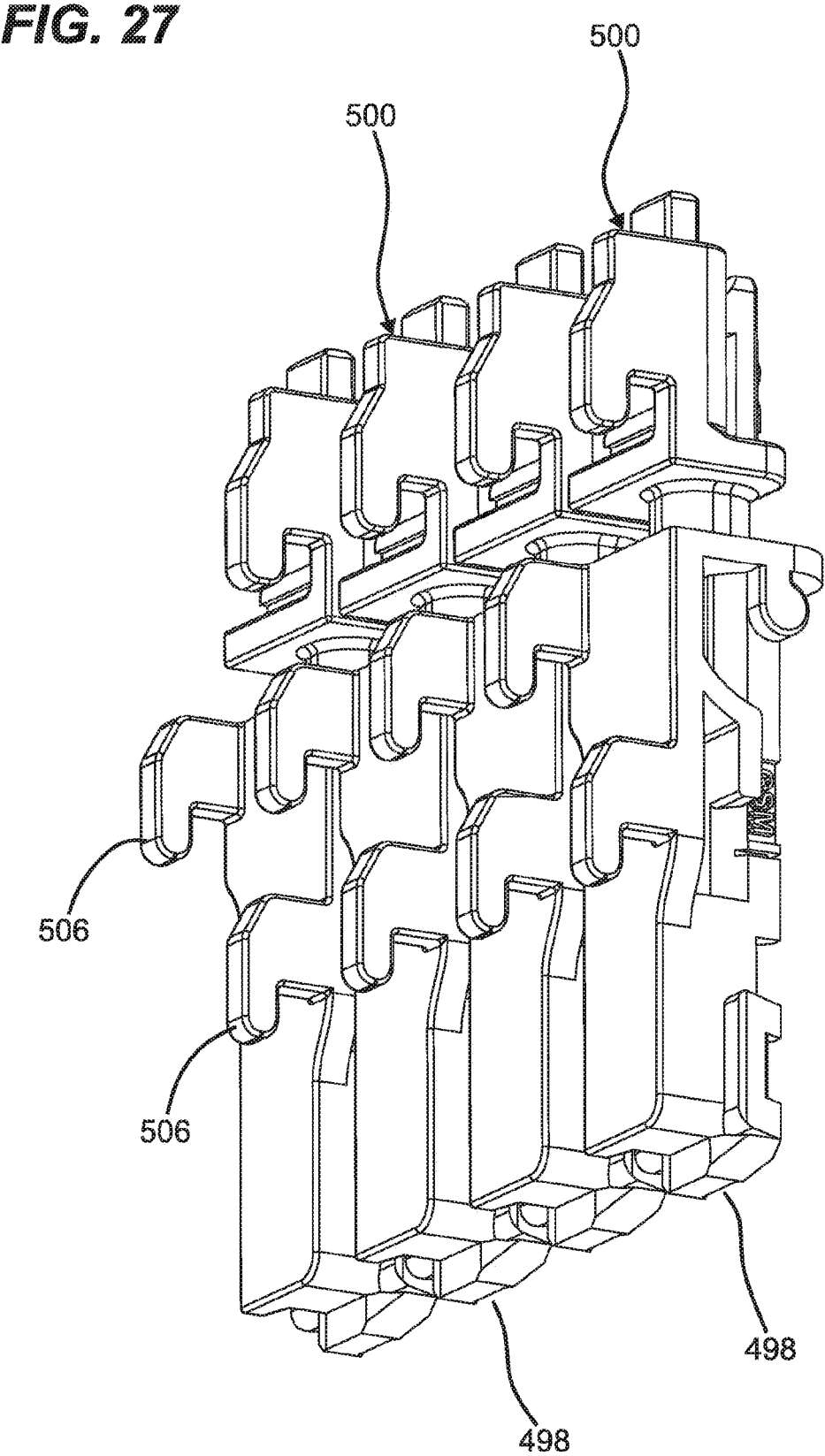
FIG. 27 depicts a plurality of cable anchor modules having connection interfaces compatible with mating connection interfaces defined by the plate of FIG. 25.

Referring back to FIG. 14, the enclosure 400 further includes an anchor plate mounting location 492 on the main wall 450 adjacent to the first end 404 of the housing 402. A cable anchor mounting plate 494 is adapted to mount to the main wall 450 at the anchor plate mounting location 494. The cable anchor mounting plate 494 includes a plurality of anchor modules mounting locations 496 for securing cable anchor modules 498 to the cable anchor mounting plate 494. The cable anchor modules 498 can include clamps, straps or other structures for attaching the cable anchor modules 498 to the cables 434. The cable anchor modules 498 can include connection interfaces 500 adapted to interconnect with corresponding connection interfaces 502 provided at each of the anchor mounting locations 496 of the cable anchor mounting plate 494. In the depicted example, the connection interfaces 502 can include a plurality of sets of slots 504, and the connection interfaces 500 can include a plurality of hooks 506 configured to engage the slots 504. The connection interfaces 502 can also include flexible latches 508 for locking the cable anchor modules 498 in retained positions once the hooks 506 have been interlocked with the slots 504. The connection interface 500 is best shown at FIG. 27, and the connection interface 502 is best shown at FIG. 25.

Figure 22:
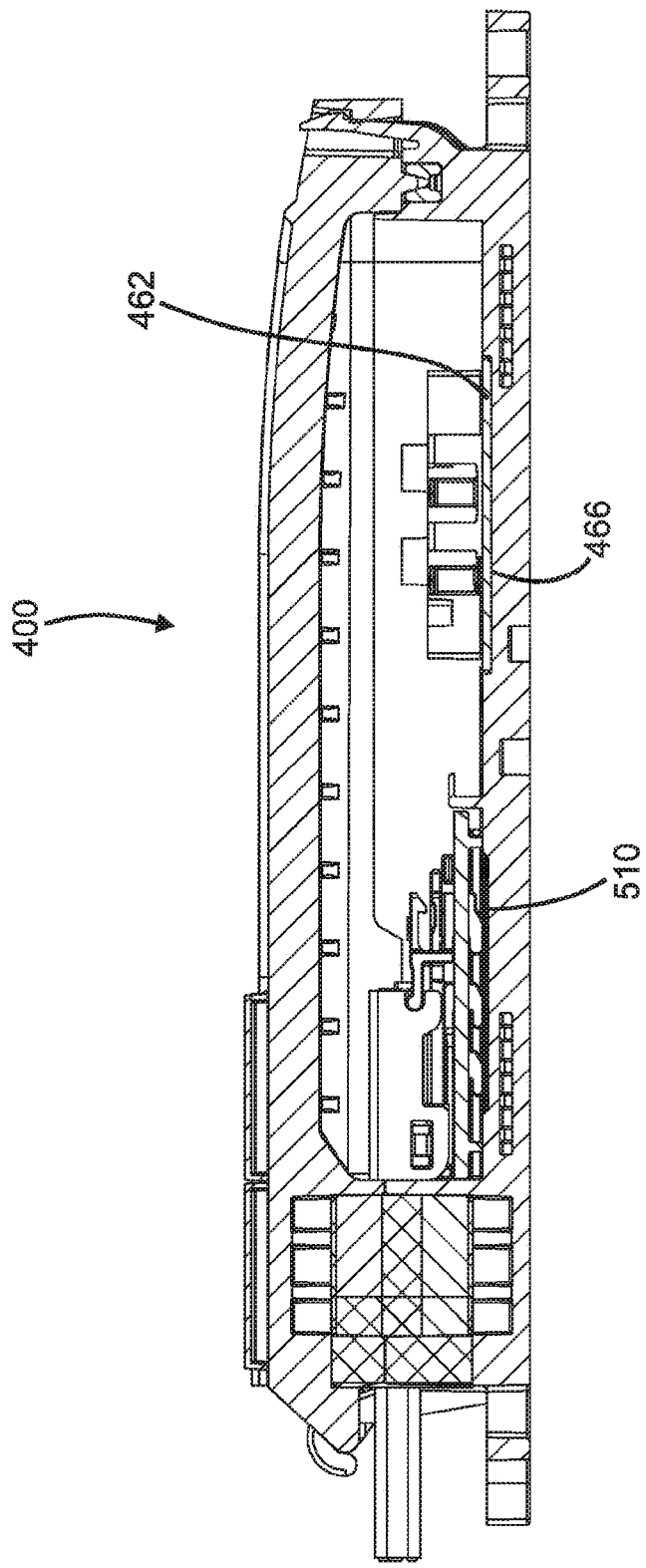
FIG. 22 is a cross-sectional view taken along section line 22-22 of FIG. 20.
Figure 23:
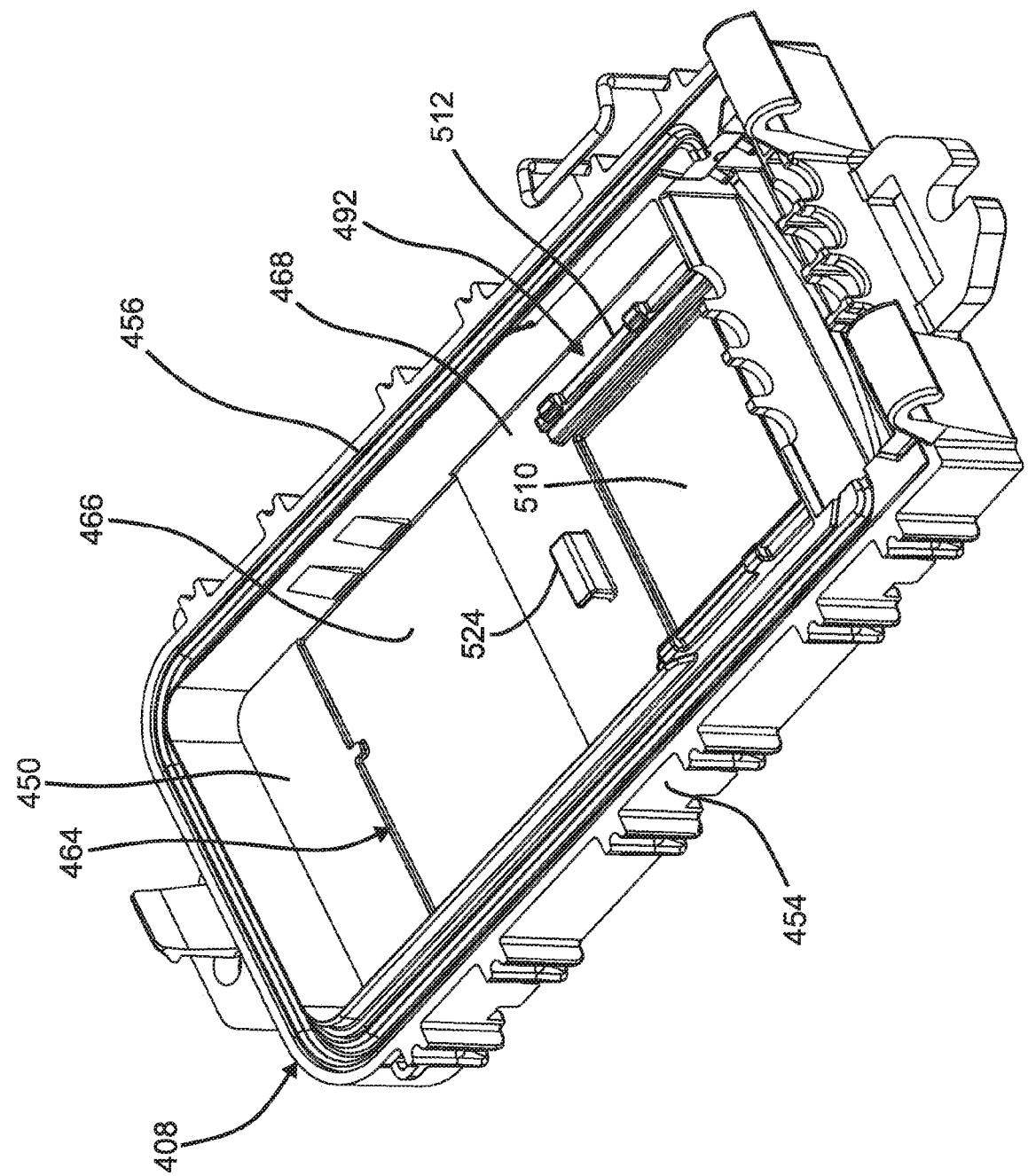
FIG. 23 is a perspective view of the base of the enclosure of FIG. 10 with the module mounting plates and seals removed.

As best shown at FIGS. 22 and 23, the main wall 450 defines a clearance recess 510 corresponding to the anchor plate mounting location 492. The clearance recess 510 is recessed relative to the primary surface 468 of the wall 450. The anchor module mounting plate 494 mounts over the clearance recess 510 and the recess 510 provides clearance for receiving the hooks 506 which project through the slots 504 when engaged with the cable anchor mounting plate 494. The plate mounting location 492 further includes mounting rails 512 unitary with the main wall 450 and positioned on opposite sides of the clearance recess 510. The mounting rails 512 define ledges 514 for supporting opposite edges of the mounting plate 494 and for positioning the mounting plate 494 at a predetermined height over the recess 510. Plate retention tabs 516 are unitary with the mounting rails 512 and function to retain the mounting plate 494 on the ledges 514.

Figure 28:
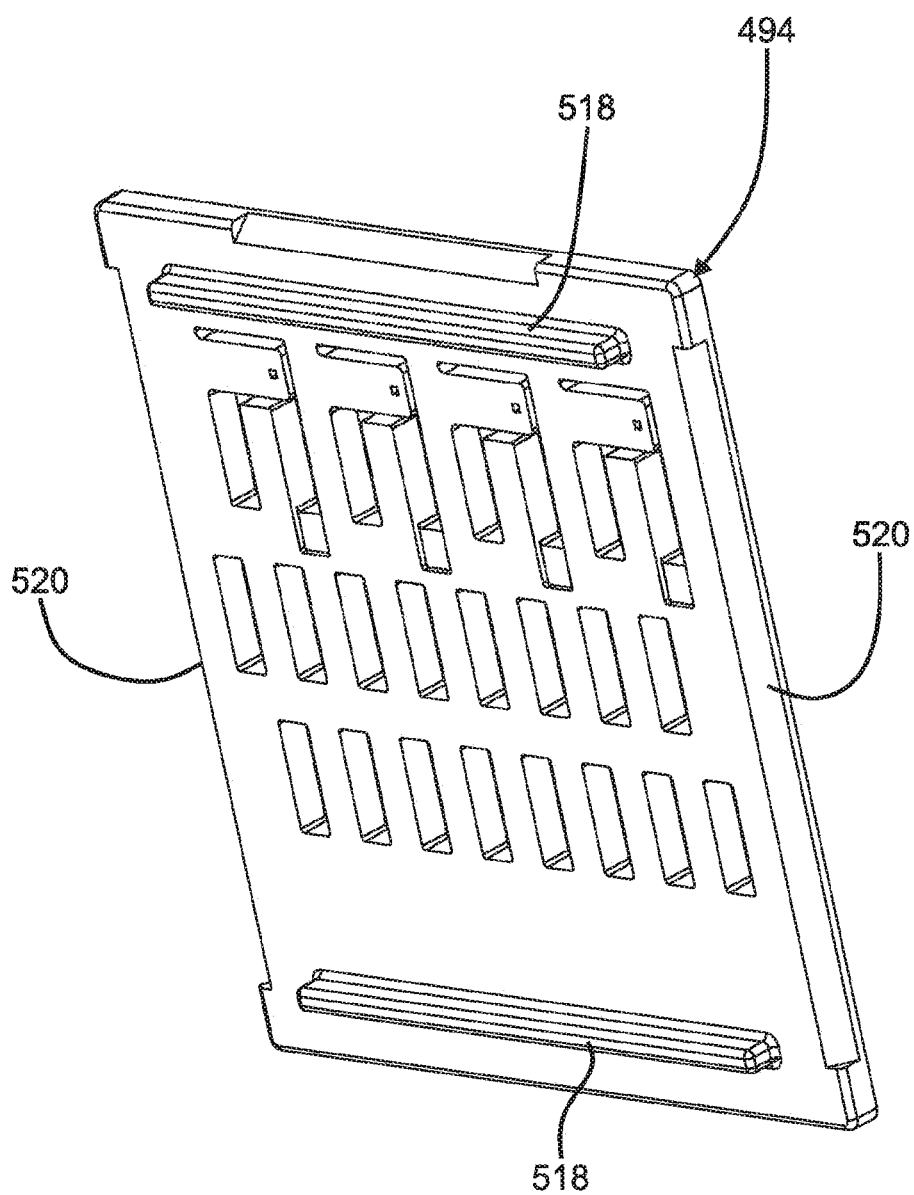
FIG. 28 is a rear, perspective view of the plate of FIG. 25.
Figure 29:
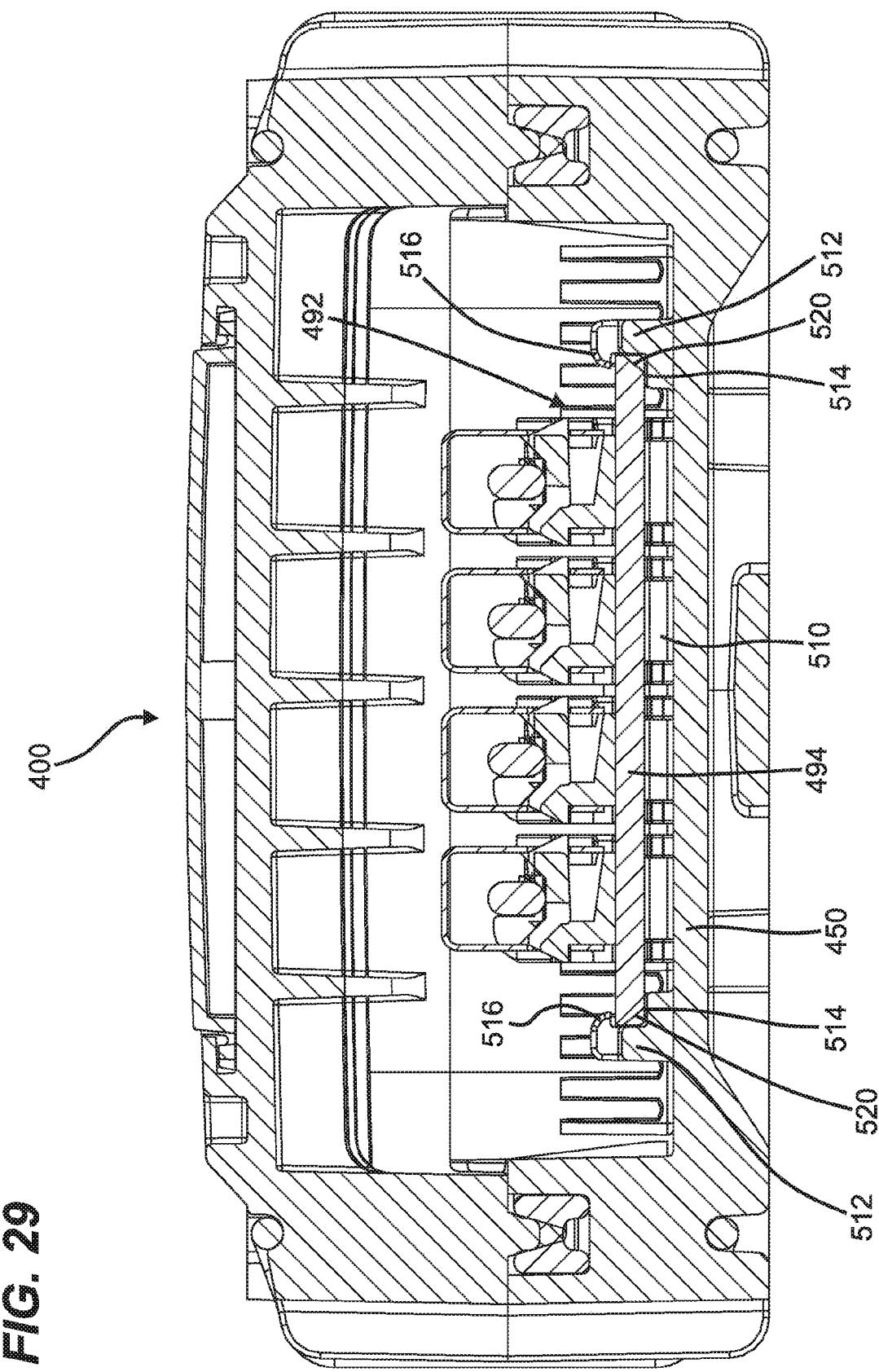
FIG. 29 is a cross-sectional view taken along section line 29-29 of FIG. 20.

As shown at FIG. 28, the bottom side of the mounting plate 494 includes stand-offs 518 for spacing a main body of the mounting plate 494 from the wall 450. The stand-offs 518 are depicted as elongate projection (e.g., rails) that extend across the width of the mounting plate 494 and project downwardly from the bottom side of the mounting plate 494. It will be appreciated that the stand-offs 518 are adapted to contact the primary surface 468 of the wall 450.

Still referring to FIG. 28, the mounting plate 494 further includes ramp surfaces 520 at the bottom side of the mounting plate 494. Ramp surfaces 520 are located at opposite side edges of the mounting plate 494. To install the mounting plate 494 at the mounting location 492, the mounting plate 494 is pressed downwardly between the mounting rails 512. As the mounting plate 494 is pressed downwardly between the mounting rails 512, the ramps 520 engage the plate retention tabs 516 causing the retention tabs 516 for flex outwardly to allow the plate 494 to move past the retention tabs and into engagement with the ledges 514. Once the plate 494 moves past the retention tabs 516, the tabs 516 elastically move back (e.g., snap back) to a retaining position in which the tabs 516 overlap a top side of the plate 494. The plate 494 can also define a ramp surface 522 that can be engaged by a tool such as a screwdriver to facilitate removing the plate 494 from the plate mounting location 492.

In certain examples, the mounting location 464 can accommodate module mounting plates of different sizes. Such plates may be larger than the plate recess 466 and can include tabs configured to engage the plate retention tabs 460 to provide for retention of the larger plates.

Referring to FIG. 23, a fiber management tab 524 is positioned between the cable anchor mounting location 496 and the component plate mounting location 464. In certain examples, optical fibers may be stored in a fiber loop within the interior of the housing 502 between the fiber management tab 524 and the second end 406 of the housing 402.

The fiber management tab 524 prevents the optical fibers from overlapping with the cable anchoring region.

Referring to FIG. 15, the enclosure 400 can also include panels 530 that mount to the front of the second housing part 410 to provide labeling of the enclosure.

Aspects of the Disclosure

Aspect 1. A telecommunications enclosure comprising: a housing including a base and a cover; and fiber management tabs that detachably mount to the base.

Aspect 2. The telecommunications enclosure of aspect 1, wherein the tabs detachably mount to a perimeter wall of the base.

Aspect 3. The telecommunications enclosure of any of aspects 1 or 2, wherein the fiber management tabs are L-shaped.

Aspect 4. The telecommunications enclosure of any of aspects 1-3, where the fiber management tabs are L-shaped with first and second perpendicular legs having different lengths.

Aspect 5. The telecommunications enclosure of any of aspects 1-4, wherein the fiber management tabs slidably mount in slots defined by the base.

Aspect 6. The telecommunications enclosure of any of aspects 1-5, wherein the base defines a fiber routing path, and wherein the fiber management tabs include fiber retaining portions that overhang the fiber routing path.

Aspect 7. The telecommunications enclosure of any of aspects 1-6, wherein the base defines a fiber routing path, wherein the fiber management tabs include fiber retaining portions, and wherein the fiber management tabs are mountable in first arrangements in which the fiber retaining portions overhang the fiber routing path and second arrangements in which the fiber retaining portions do not overhang the fiber routing path to facilitate routing optical fibers along the fiber routing path.

Aspect 8. The telecommunications enclosure of any of aspects 1-5, wherein the base includes a perimeter channel in which a perimeter seal is positioned, wherein the perimeter channel is defined in part by an inner sidewall, and wherein the fiber management tabs mount to the inner sidewall.

Aspect 9. The telecommunications enclosure aspect 8, wherein the fiber management tabs mount within slots defined within the inner sidewall.

Aspect 10. The telecommunications enclosure of aspect 8 or 9, wherein the base defines a main compartment inside the inner sidewall, wherein the fiber management tabs include fiber retention portions, wherein the fiber management tabs are mountable to the inner sidewall in first arrangements in which the fiber retention portions overhang the perimeter channel, and wherein the fiber management tabs are mountable to the inner sidewall in second arrangements in which the fiber retention portions overhang the main compartment.

Aspect 11. The telecommunications enclosure of any of aspects 1-10, wherein the base defines a main base surface to which components can be mounted, the main base surface corresponding to a main interior of the base, and wherein the fiber management tabs include fiber retention portions that oppose the main base surface when mounted to the base in at least one arrangement.

Aspect 12. The telecommunications enclosure of any of aspects 1-11, wherein the fiber management tabs are mountable to the base in another arrangement in which the fiber retention portions project away from the main interior of the base and/or do not oppose the main base surface.

Aspect 13. The telecommunications enclosure of aspect 12, further comprising a splice tray and/or a splitter tray, and/or a wavelength division multiplexer tray, and/or a passive optical splitter and/or a wavelength division multiplexer, and/or a cable anchor is/are positioned within the housing.

Aspect 14. The telecommunications enclosure of any of aspects 1-13, wherein a fiber routing path extends about at least a portion of a perimeter of the base.

Aspect 15. The telecommunications enclosure of any of aspects 1-14, wherein the enclosure includes a cable sealing arrangement for sealing about cables that enter the enclosure at one end of the closure.

Aspect 16. The telecommunications enclosure of any of aspects 1-15, wherein the enclosure includes cable sealing arrangements for sealing about cables that enter the enclosure at opposite ends of the closure.

Aspect 17. A telecommunications enclosure comprising: a housing including a base and a cover; and the base defining an inner compartment defined in part by a floor of the base, the floor of the base including a plurality of bosses that project upwardly from a main portion of the floor.

Aspect 18. The telecommunications enclosure of aspect 17, wherein a component such as a mounting plate, or a mounting tray, or a splice tray, or a splitter tray, or a wdm tray can be fastened to and supported on the bosses.

Aspect 19. The telecommunications enclosure of aspect 17, wherein the bosses are tall and wide enough to accommodate fasteners such as screws therein.

Aspect 20. The telecommunications enclosure of aspects 18 or 19, wherein the bosses are initially unused and provide means for updating or retrofitting the enclosure with different tray or component mounting configurations.

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. An enclosure comprising:
a housing including first and second housing parts that cooperate to enclose an interior of the housing, the first and second housing parts being moveable relative to one another between an open position and a closed position;
a perimeter seal defined between the first and second housing parts when the first and second housing parts are in the closed position;
the first housing part including a main wall and a perimeter wall that projects from the main wall, wherein the perimeter wall includes first and second sidewall portions respectively at first and second sides of the housing, wherein the first and second sidewall portions are separated by a width of the housing, wherein plate retention tabs are unitarily formed with the first and second sidewall portions, wherein the enclosure includes a component mounting plate sized to extend across the width of the housing, wherein the component mounting plate is retained at the main wall at a component plate mounting location within the interior of the housing; and wherein the main wall defines a plate recess for receiving the component mounting plate, wherein the plate retention tabs include ramp surfaces that angle from the first and second sidewall portions into the interior of the housing as the ramp surfaces extend in a direction toward the main wall, wherein the ramp surfaces terminate at shoulder portions that oppose the main wall, wherein the shoulder portions retain the component mounting plate within the plate recess.

2. The enclosure of claim 1, wherein the component mounting plate includes a plurality of module mounting locations for mounting component holding modules to the component mounting plate.

3. The enclosure of claim 2, wherein the component holding modules are secured at the module mounting locations by connection interfaces that include snap-fit features.

4. The enclosure of claim 2, wherein the module mounting locations are through-holes through the component mounting plate.

5. The enclosure of claim 4, wherein the module mounting locations include a connection interface which are configured to interlock with a connection interface of the component holding modules.

6. The enclosure of claim 5, wherein the connection interfaces include mating tongue and groove configurations that are slid together and latched in a locked position by a flexible latch.

7. The enclosure of claim 6, wherein the flexible latch is a cantilever.

8. The enclosure of claim 2, wherein the component holding modules are adapted for holding components selected from a group including passive optical power splitters, wavelength division multiplexers, or splice reinforcing sleeves.

9. The enclosure of claim 1, wherein a keying interface is defined between the component mounting plate and the main wall to ensure the component mounting plate is mounted at a single pre-determined orientation within the plate recess.

10. The enclosure of claim 9, wherein the keying interface includes a key, provided on one of the main wall and the component mounting plate, that fits within a key receptacle provided on the other of the main wall and the component mounting plate.

11. The enclosure of claim 10, wherein the key is integrated with the main wall and projects into the plate recess, and the key receptacle is defined at an edge of the component mounting plate.

12. The enclosure of claim 1, wherein the component mounting plate includes side notches adapted for receiving a tool for facilitating removing the component mounting plate from the plate recess.

13. The enclosure of claim 12, wherein the tool comprises a screwdriver.

14. An enclosure comprising:
a housing including first and second housing parts that cooperate to enclose an interior of the housing, the first and second housing parts being moveable relative to one another between an open position and a closed position;
a perimeter seal defined between the first and second housing parts when the first and second housing parts in the closed position;
the first housing part including a main wall and a perimeter wall that projects from the main wall, wherein the perimeter wall includes first and second sidewall portions respectively at first and second sides of the housing, wherein the first and second sidewall portions are separated by a width of the housing, wherein plate retention tabs are unitarily formed with the first and second sidewall portions, wherein the enclosure includes a component mounting plate sized to extend across the width of the housing, wherein the component mounting plate is retained at the main wall at a component plate mounting location within the interior of the housing, and
wherein the main wall defines a plate recess for receiving the component mounting plate, wherein a keying interface is defined between the component mounting plate and the main wall to ensure the component mounting plate is mounted at a single pre-determined orientation within the plate recess.

15. The enclosure of claim 14, wherein the component mounting plate includes a plurality of module mounting locations for mounting component holding modules to the component mounting plate.

16. The enclosure of claim 15, wherein the component holding modules are secured at the module mounting locations by connection interfaces.

17. The enclosure of claim 15, wherein the component holding modules are adapted for holding components selected from a group including passive optical power splitters, wavelength division multiplexers, or splice reinforcing sleeves.

18. The enclosure of claim 14, wherein the keying interface includes a key, provided on one of the main wall and the component mounting plate, that fits within a key receptacle provided on the other of the main wall and the component mounting plate.

19. The enclosure of claim 18, wherein the key is integrated with the main wall and projects into the plate recess, and the key receptacle is defined at an edge of the component mounting plate.

20. The enclosure of claim 14, wherein the component mounting plate includes side notches adapted for receiving a tool for facilitating removing the component mounting plate from the plate recess.

* * * * *